(12) United States Patent
Sakata

(10) Patent No.: US 7,434,178 B2
(45) Date of Patent: Oct. 7, 2008

(54) MULTI-VIEW VEHICULAR NAVIGATION APPARATUS WITH COMMUNICATION DEVICE

(75) Inventor: Katsumi Sakata, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 826 days.

(21) Appl. No.: 10/438,059

(22) Filed: May 15, 2003

(65) Prior Publication Data
US 2003/0216861 A1  Nov. 20, 2003

(30) Foreign Application Priority Data
May 17, 2002  (JP) .............................. 2002-143564

(51) Int. Cl.
*G06F 3/00* (2006.01)
(52) U.S. Cl. ...................................... 715/863; 715/727
(58) Field of Classification Search .................. 715/864, 715/863, 727; 345/173
See application file for complete search history.

(56) References Cited

U.S. PATENT DOCUMENTS 5,819,227 A * 10/1998 Obuchi ........................... 705/1
6,252,948 B1 * 6/2001 Okamoto .................. 379/93.23
6,288,704 B1 * 9/2001 Flack et al. .................. 345/158
6,507,643 B1 * 1/2003 Groner ..................... 379/88.14
6,874,128 B1 * 3/2005 Moore et al. ................. 715/792
7,065,713 B1 * 6/2006 Dutta et al. .................. 715/768

FOREIGN PATENT DOCUMENTS

| JP | 5-260219 | 10/1993 |
| JP | 8-154115 | 6/1996 |
| JP | 10-124463 | 5/1998 |
| JP | 11-187156 | 7/1999 |

* cited by examiner

*Primary Examiner*—Kieu D Vu
(74) *Attorney, Agent, or Firm*—Oliff & Berridge, PLC

(57) ABSTRACT

A communication device for communicating with an external is connectable to a navigation apparatus. The navigation apparatus includes a display portion, an input portion for inputting memo information, an outgoing/incoming call determination portion, and a display control portion for controlling the display portion. The outgoing/incoming call determination portion determines whether or not the communication portion conducts an outgoing call and determining whether the communication portion receives an incoming call. When the outgoing/incoming call determination portion concludes that the communication portion conducts the outgoing call or that the communication portion receives the incoming call, the display control portion splits the display portion into a memo screen on which content of the memo information is displayed and a navigation screen.

15 Claims, 18 Drawing Sheets

FIG. 8

MEMO INFORMATION LIST

| DATE | COMMUNICATED PERSON | COMMUNICATED PERSON |
|---|---|---|
| 2/10 19:05 | ○○○○ | ---------- |
| 2/11 11:25 | ×△YAMADA | YAMADA 090 1234 5678 |
| 2/13 9:47 | △△△△ | ~ ~ ~ ~ ~ ~ ~ ~ ~ |

△ — 34
▽ — 34

RETURN  CANCEL

FIG. 9

CORRECTING-DATABASE SELECTION

PHONE BOOK DATABASE    DESTINATION DATABASE

×××DATABASE    ○○○DATABASE

RETURN

FIG. 10

PHONE BOOK DATABASE CORRECTION

NAME SELECTION

| Q | R | S | T | U | V | W | X | Y | Z |

△
▽

| △△YAGI | ○×YAMADA |
| ~~YAMANE | YAMASHI |
| ××YANAGIDA | YASUI |

RETURN ◁  ▷

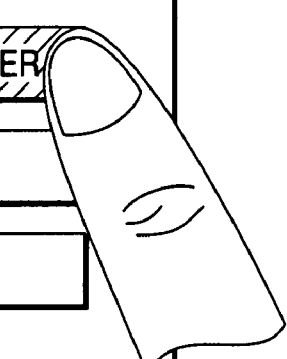

(FIG. 13 CONTINUED)
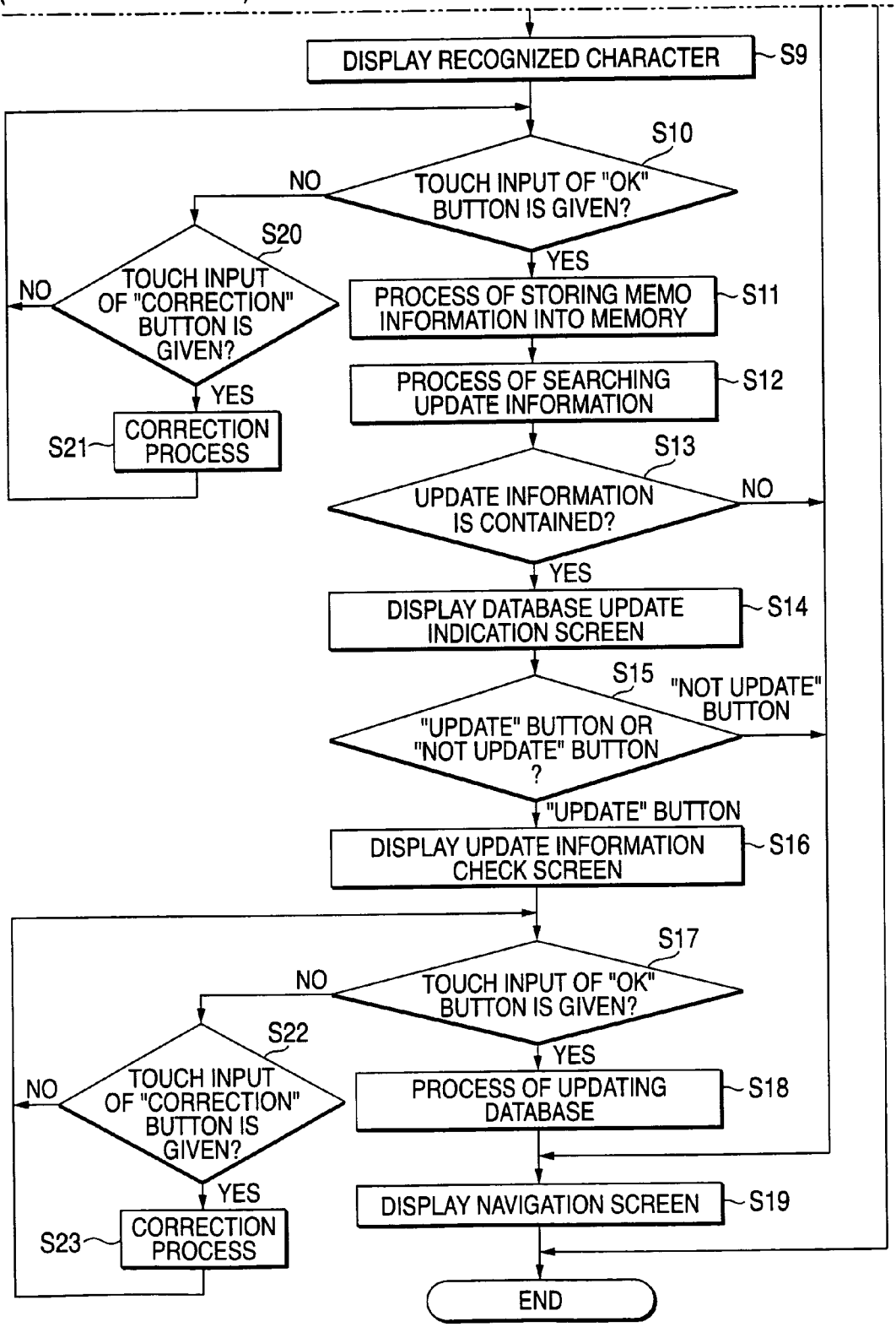

FIG. 25

CHARACTER EXTRACTION KEYWORD REGISTRATION

GENERAL REGISTRATION

INDIVIDUAL REGISTRATION

RETURN

FIG. 26

GENERAL REGISTRATION

| NAME | PHONE NUMBER | ADDRESS |
| DATE | TRAFFIC FACILITY | WEATHER |
| ~ ~ ~ | . . . . . | × × × |

REGISTER

FIG. 27

INDIVIDUAL REGISTRATION

SELECT REGISTRANT    ~~~~~

| BUSINESS | HOBBY | × × × |
| △ △ △ | ○ ○ ○ | . . . . . |

RETURN    REGISTER

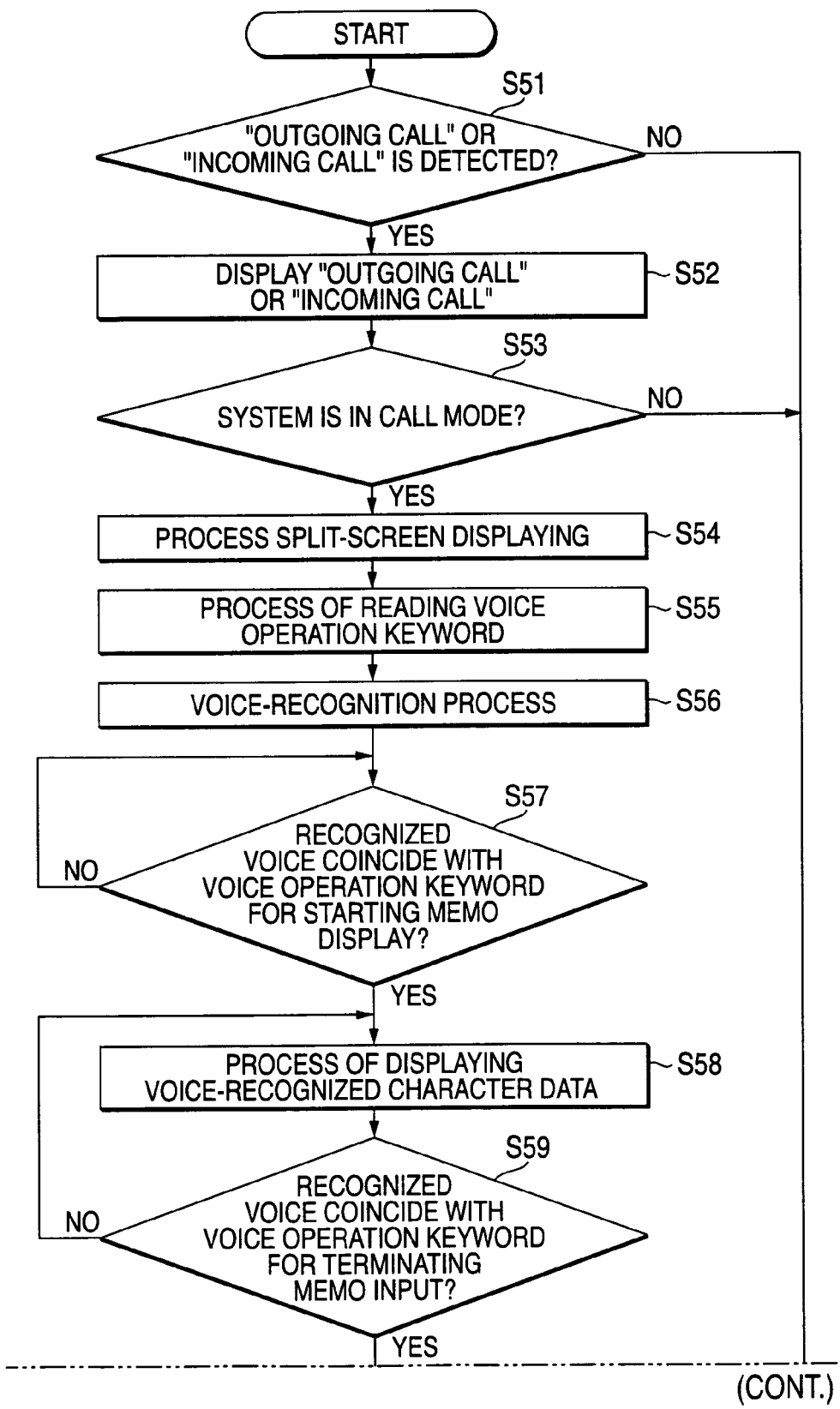

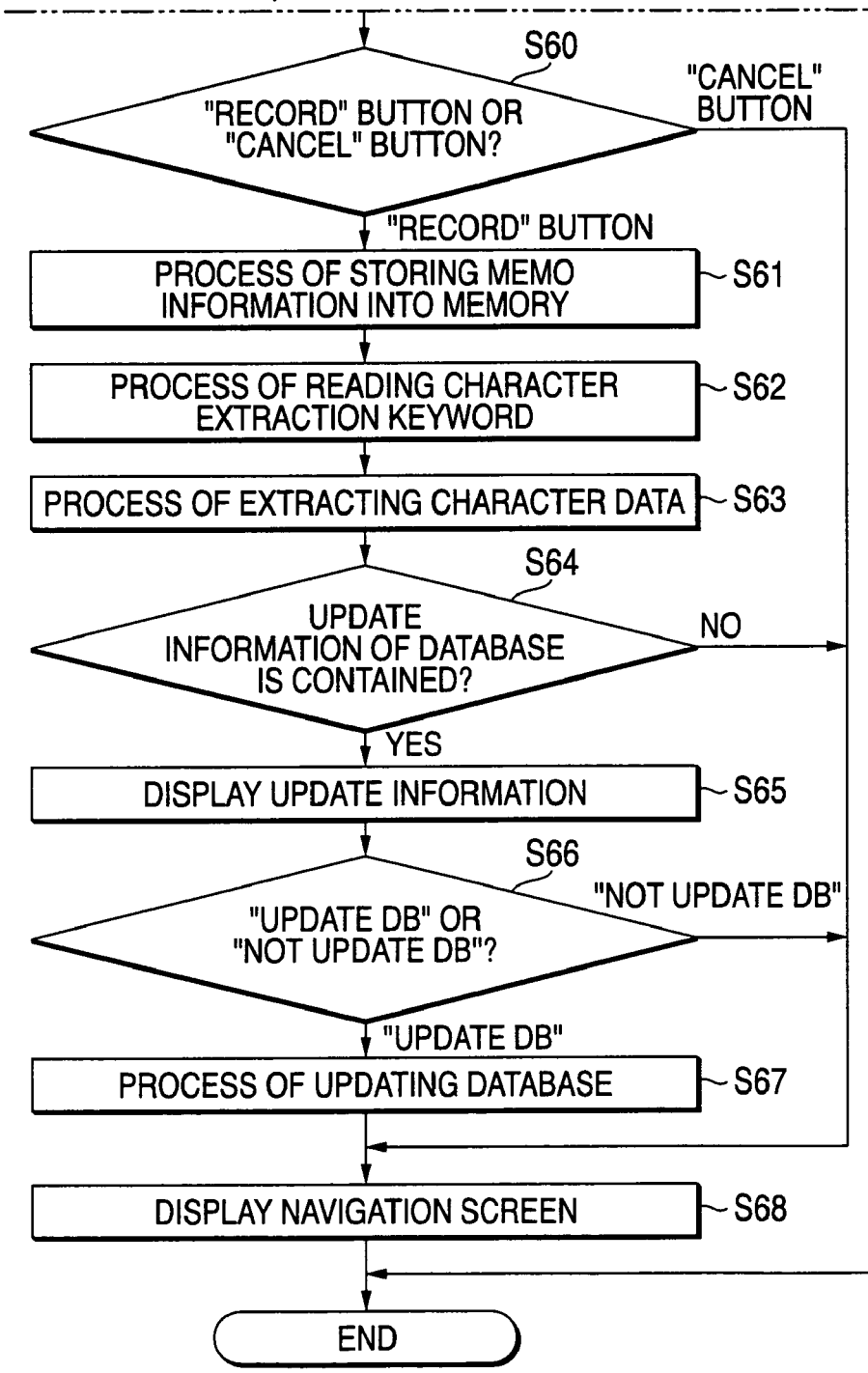

MULTI-VIEW VEHICULAR NAVIGATION APPARATUS WITH COMMUNICATION DEVICE

The present disclosure relates to the subject matter contained in Japanese Patent Application No. 2002-143564 filed on May 17, 2002, which is incorporated herein by reference in its entirety.

BACKGROUND OF THE INVENTION

1. Field of the Invention

The invention relates to a navigation apparatus and, more particularly, a navigation apparatus to which a communication device can be connected.

2. Description of the Related Art

In the navigation apparatus according to the related art, there are a system to which a communication device such as a mobile phone can be connected to execute communication (including speech) with the outside, and a system which has a hand-free communication function to execute speech during running safely and comfortably.

In the navigation apparatus to which such a communication device is connected, when the navigation apparatus detects an incoming call or an outgoing call of the mobile phone and then enters into a call mode, the speech of the other person in communication is output from a loudspeaker connected to the navigation apparatus and also the speech picked up by a microphone connected to the navigation apparatus is transmitted via the communication device, so that user can speak with a person who issues/receives the call.

In such navigation apparatus in the related art, the speech while driving can be executed safely and comfortably by the hand-free communication function, etc. However, such systems do not deal with a case where user wishes to take notes of the content of the speech. Therefore, in order to take notes during speaking, a writing paper, a writing tool, etc. must be taken out. But it is difficult for a driver to prepare them while driving, and such motion of the driver leads to careless forward looking and is undesirable for safety.

Also, it is troublesome even in the stopping state to take notes by taking out the writing paper, the writing tool, etc. every time while speaking. In addition, it is impossible to take notes at once unless the writing tool, etc. are prepared previously. Thus, there is such a problem that such navigation apparatus is inconvenient.

Also, in some cases, a driver talks while looking at map information displayed on a screen according to situations. Thus, in such states, the driver would like to take notes of information such as a location of a destination, surrounding buildings, where to make contact, etc., which are heard from the other person in communication. In this case, there is such a problem that the driver cannot easily take notes of the information while looking at the map.

In addition, in the navigation apparatus according to the related art, such a system has not been provided that speech contents, memo contents, etc. can be automatically registered in a database such as an address book and a phone book. Thus, user must input necessary registration contents separately once again. Hence, there is such a problem that an operation becomes cumbersome and troublesome.

SUMMARY OF THE INVENTION

The invention has been made in view of the above subjects. It is an object of the invention to provide a navigation apparatus, which is serviceable and convenient of use for the user, and is capable of taking notes easily to display the notes on a display screen while displaying a navigation screen at a time of talking over the phone and also capable of putting memo information to practical use.

In order to achieve the above object, according to a first aspect of the invention, a communication device for communicating with an external is connectable to a navigation apparatus. The navigation apparatus includes a display portion, an input portion, an outgoing/incoming call determination portion, and a display control portion. The input portion inputs memo information. The outgoing/incoming call determination portion determines whether the communication portion conducts an outgoing call and determining whether the communication portion receives an incoming call. The display control portion controls the display portion. When the outgoing/incoming call determination portion concludes that the communication portion conducts the outgoing call or that the communication portion receives the incoming call, the display control portion splits the display portion into a memo screen on which content of the memo information is displayed and a navigation screen.

In the first aspect, when the incoming call or the outgoing call of the communication portion is detected, the display portion is split/displayed into the memo screen and the navigation screen. Therefore, for example, while displaying the navigation screen on which the map for the route guidance is displayed, memo information input via the input portion can be displayed on the memo screen. As a result, in order to take the notes, the user is not required to take out the writing paper, the writing tool, etc. every time and to prepare them previously. Thus, the user can take notes easily and the convenience in use for the user can be improved.

According to a second aspect of the invention, the navigation apparatus of the first aspect further includes a memo input processing portion for conducting a predetermined process based on a predetermined input signal from the input portion.

In the second aspect, the predetermined operating process is executed based on the predetermined input signal from the input portion. Therefore, the predetermined operating process is executed simply can be executed simply. Thus, the convenience in use for the user can be further improved.

According to a third aspect of the invention, in the second aspect, the predetermined process includes a process for starting to take notes on the memo screen and a process for terminating to take notes on the memo screen.

According to a fourth aspect of the invention, in any one of the first and second aspects, the input portion includes a touch panel for drawing the memo information on the memo screen in accordance with a touch operation. The navigation apparatus further includes a character recognition portion, a memo information storage portion, and a first storage control portion. The character recognition portion recognizes the memo information drawn on the memo screen as character data. The first storage control portion stores the character data recognized by the character recognition portion into the memo information storage portion.

In the fourth aspect, the user can take notes simply on the memo screen via the touch panel. Also, the drawing data are recognized as the character data. Then, the recognized character data are stored as the memo information in the memo information storing portion. Therefore, a memory capacity can be reduced rather than a case where the drawing data are to be stored. Also, the character data that are subjected to the character recognition can be used positively in other applications. As a result, the availability of the drawing data can be enhanced.

According to a fifth aspect of the invention, in the fourth aspect, the display control portion display the character data recognized by the character recognition portion on the memo screen.

In the fifth aspect, the character data that are recognized by the character recognition portion are displayed on the memo screen. Therefore, the user can check whether or not the character recognition has been executed precisely.

According to a sixth aspect of the invention, in any one of the first to fifth aspects, the input portion includes a voice acquiring portion for acquiring voice as voice data. The navigation apparatus further includes a voice recognition portion, a memo information storage portion, and a second storage control portion. The voice recognition portion recognizes as character data the voice data acquired by the voice acquiring portion and voice data received by the communication portion. The second storage control portion stores the character data recognized by the voice recognition portion into the memo information storage section.

In the sixth aspect, the voice data that are received by the voice acquiring portion and the voice data that are received by the communication portion are recognized as the character data, and then are stored in the memo information storage portion. Therefore, the memory capacity can be reduced rather than a case where the voice data are to be stored. Also, the character data that are subjected to the voice recognition can be used positively in other applications. As a result, the availability of the voice data can be enhanced.

According to a seventh aspect of the invention, in the sixth aspect, the display control portion display the character data recognized by the voice recognition portion on the memo screen.

In the seventh aspect, the character data that are recognized by the voice recognition portion are displayed on the memo screen. Therefore, the user can check whether or not the voice recognition has been executed precisely.

According to an eighth aspect of the invention, the navigation apparatus of any one of the sixth and seventh aspects, further includes a memo input processing portion and an operation keyword registration portion. The memo input processing portion conducts a predetermined process based on a predetermined input signal from the input portion. The operation keyword registration portion registers an operation keyword. When the voice data acquired by the voice acquiring portion coincides with the operation keyword, the memo input processing portion conducts the predetermined process.

In the eighth aspect, the user can register the operation keyword. Also, when the voice that corresponds to the operation keyword is received by the voice acquiring portion, the predetermined operating process is carried out. Therefore, the operation of the user to take notes can be facilitated, and thus the convenience in use for the user can be improved.

According to a ninth aspect of the invention, in the eighth aspect, the operation keyword registration portion registers the operation keyword for each other person in communication individually.

In the ninth aspect, since the operation keyword is registered individually in response to the other person in communication, the operation keyword can be changed in answer to the other person in communication. Therefore, this navigation apparatus can deal with various applications of the user, and thus the convenience in use for the user can be improved much more.

According to a tenth aspect of the invention, the navigation apparatus of any one of the fourth to ninth aspects, further includes a character-extraction keyword registration portion for registering a character extraction keyword utilized for extracting a predetermined character data from the character data recognized by the character recognition portion.

In the tenth aspect, the user can register the character extraction keyword. Therefore, the user can extract the predetermined character data, which the user wishes to extract, from the character data. Also, extraction of the predetermined character data can be executed to meet the needs of the user.

According to an eleventh aspect of the invention, in the tenth aspect, the character-extraction keyword registration portion registers the character extraction keyword for each other person in communication individually.

In the eleventh aspect, since the character extraction keyword is registered individually in response to the other person in communication, the character data to be extracted can be changed in answer to the other person in communication. Therefore, this navigation apparatus can deal with various applications of the user, and thus the convenience in use for the user can be further improved.

According to a twelfth aspect of the invention, the navigation apparatus of the tenth or eleventh aspect, further includes a character data extraction portion and a character data registration portion. The character data extraction portion extracts a predetermined character data from the character data based on the character extraction keyword. The character data registration portion registers the extracted character data by the character data extraction portion in a predetermined data base.

In the twelfth aspect, the predetermined character data are extracted from the character data based on the character extraction keyword. Then, the predetermined character data that have been extracted are registered in the predetermined database. Therefore, the labor that is required of the user to input the registered items separately to register in the database can be omitted, and thus this navigation apparatus becomes serviceable and convenient of use for the user.

According to a thirteenth aspect of the invention, in the twelfth aspect, the character data registration portion includes an update information determination portion and an update information registration portion. The update information determination portion determines whether update information relating to the predetermined data base is contained in the predetermined character data extracted by the character data extraction portion. The update information registration portion registers the update information in the predetermined data base when the update information determination portion concludes that the update information is contained.

In the thirteenth aspect, only when it is concluded that the update information are contained in the predetermined character data, the update information can be registered in the predetermined database. Therefore, the update of the predetermined database can be executed appropriately.

According to a fourteenth aspect, the navigation apparatus of any one of the twelfth and thirteenth aspects, further includes a character data correction portion for correcting the character data registered in the predetermined data base by the character data registration portion, desirably.

In the thirteenth aspect, even if wrong data are registered in the predetermined database, the user can correct such wrong data arbitrarily and also necessary data can be added/corrected. Therefore, the precision of the information that are registered in the predetermined database can be enhanced.

BRIEF DESCRIPTION OF THE DRAWINGS

FIG. 8 is a view showing an example displayed on the display screen to explain a utilization mode of the navigation apparatus according to the embodiment (1).

FIG. 9 is a view showing an example displayed on the display screen to explain a utilization mode of the navigation apparatus according to the embodiment (1).

FIG. 10 is a view showing an example displayed on the display screen to explain a utilization mode of the navigation apparatus according to the embodiment (1).

FIG. 11 is a view showing an example displayed on the display screen to explain a utilization mode of the navigation apparatus according to the embodiment (1).

FIG. 12 is a view showing an example displayed on the display screen to explain a utilization mode of the navigation apparatus according to the embodiment (1).

FIG. 25 is a view showing an example displayed on the display screen to explain a utilization mode of the navigation apparatus according to the embodiment (2).

FIG. 26 is a view showing an example displayed on the display screen to explain a utilization mode of the navigation apparatus according to the embodiment (2).

FIG. 27 is a view showing an example displayed on the display screen to explain a utilization mode of the navigation apparatus according to the embodiment (2).

FIG. 28 is a flowchart explaining processing operations of a memo function executed by a navigation control portion in the navigation apparatus according to the embodiment (2).

DETAILED DESCRIPTION OF THE PREFERRED EMBODIMENTS

Figure 1:
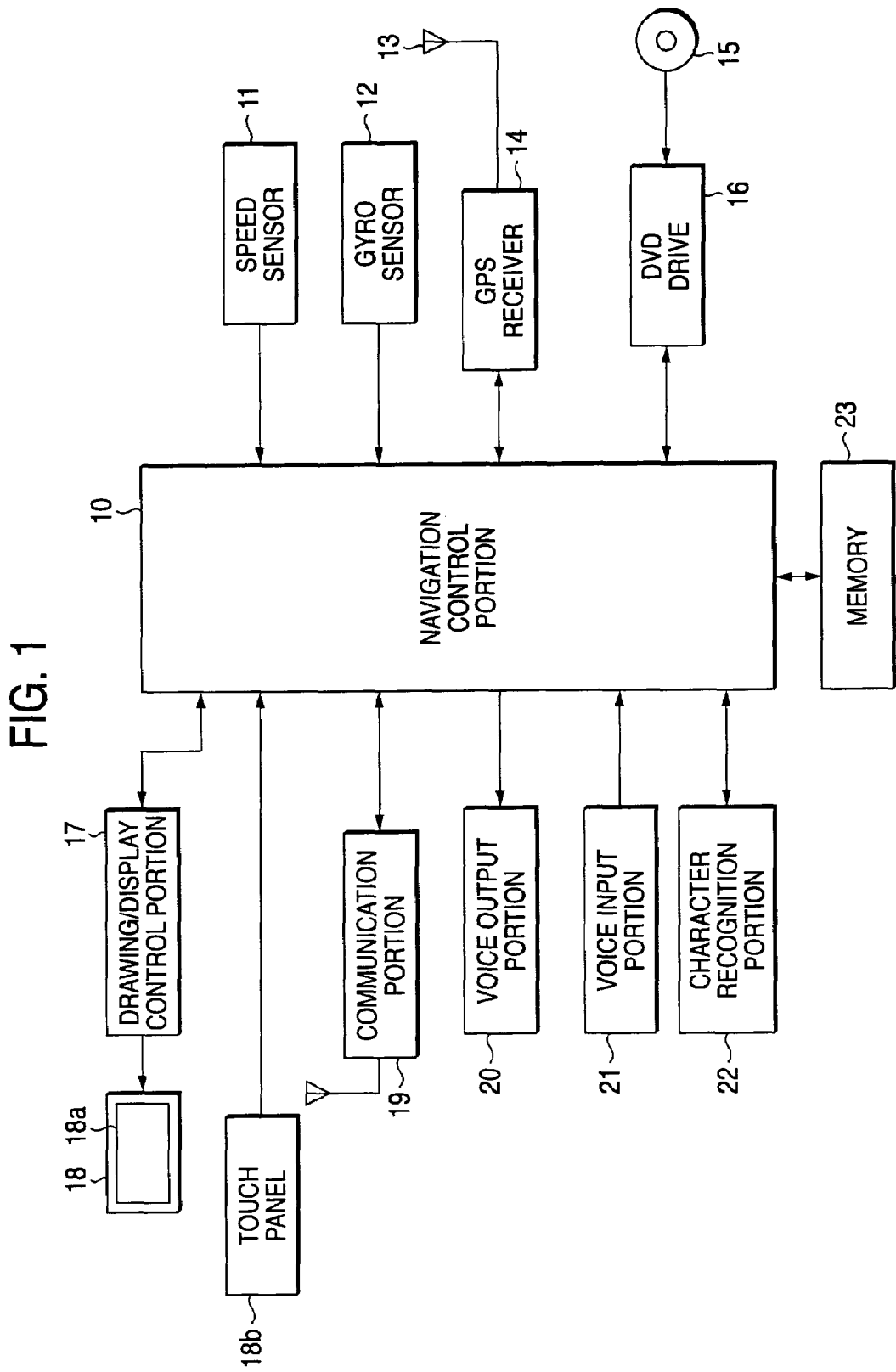
FIG. 1 is a block diagram showing schematically a pertinent portion of a navigation apparatus according to an embodiment (1) of the invention.

Embodiments of a navigation apparatus according to the invention will be explained with reference to the drawings hereinafter. FIG. 1 is a block diagram showing schematically a pertinent portion of a navigation apparatus according to an embodiment (1) of the invention.

A speed sensor 11 and a gyro sensor 12 are connected to a navigation control portion 10 (hereinafter referred to as "navi control portion"). The speed sensor 11 calculates a vehicle speed to acquire the covered distance. The gyro sensor 12 acquires a running direction. The navi control portion 10 determines a location of own vehicle based on the covered distance and the running direction (Self-Contained Navigation).

Also, a GPS receiver 14 for receiving the GPS signal from a satellite via an antenna 13 is connected to the navi control portion 10. The navi control portion 10 also determines the location of own vehicle based on the GPS signal (GPS Navigation).

Also, a DVD drive 16 that can pick out electronic map data, etc. from a DVD-ROM 15, in which map information including the electronic map data is stored, is connected to the navi control portion 10. The navi control portion 10 executes a process of matching the determined location of own vehicle with the electronic map data, i.e., a so-called map matching process at a predetermined time interval, and executes a process of displaying a map, on which the location of own vehicle is indicated precisely, on a display screen 18a.

Also, a display device 18 is connected to the navi control portion 10 via a drawing/display control portion 17. A touch panel 18b is provided on a display screen 18a of the display device 18. The touch panel 18b makes possible an input operation via operation buttons displayed on the display screen 18a, etc. and an input operation of characters, etc. into a predetermined drawing area of the display screen 18a by the handwriting.

Also, a communication portion 19 having a radio device such as a mobile phone, a voice output portion 20 having an amplifier and a loudspeaker, a voice input portion 21 having a microphone that can pick up voice from the outside, and a character recognition portion 22 for recognizing drawing data such as characters, which are input by the handwriting via the touch panel 18b, as character data are connected to the navi control portion 10.

When the navi control portion 10 detects an incoming call or an outgoing call of the communication portion 19 to enter in a call mode, the navi control portion 10 causes the display device 18 to execute a process of splitting the display screen 18a into a navigation screen and a memo screen, into which the characters and the like can be input by the handwriting via the touch panel 18b.

The drawing/display control portion 17 executes a drawing/displaying process based on a drawing/display instruction issued from the navi control portion 10. For example, the drawing/display control portion 17 executes a process of switching the display screen 18a into the split display screen consisting of the navigation screen and the memo screen, a process of drawing/displaying characters and the like, which are input by the handwriting via the touch panel 18b, on the memo screen, and a process of displaying a map and the like on the navigation screen.

The character recognition portion 22 executes a process of recognizing drawing data such as characters and the like, which are input into the memo screen by the handwriting via the touch panel 18b, as character data based on the instruction issued from the navi control portion 10. The drawing/display control portion 17 executes a process of displaying the character data, which are recognized by the character recognition portion 22, on the display screen 18a based on the instruction issued from the navi control portion 10.

Also, the navi control portion 10 executes a process of converting the voice data of the other person, which is received via the communication portion 19, in communication into voice and then outputting such voice from the voice output portion 20, and a predetermined voice process of outputting the voice data, which are input from the voice input portion 21, to the communication portion 19 to communicate with the other person.

Also, the navi control portion 10 executes a process of storing memo information containing the character data, which are recognized by the character recognition portion 22, and communication history information such as communication date, the other person of communication and the like into a memory 23. Also, the navi control portion 10 decides whether or not the update information the contents of which correspond to the set item of the database stored in the memory are contained, and then executes a process of updating the contents of the database if the update information are contained.

As the database stored in the memory 23, there are listed, for example, the phone book database that are downloaded via the communication portion 19 and stored in the memory 23, the destination database that is linked with the information of the phone book and the address book, which are taken out from the DVD-ROM 15, to set the destination, etc.

Also, as the set items of the database, in the case of the phone book, for example, name, phone number, address, mail address, date of birth, interest, inclination, etc. can be provided.

FIG. 2 to FIG. 10 are views showing examples displayed on the display screen 18a to explain utilization modes of the navigation apparatus according to the embodiment (1).

Figure 2:
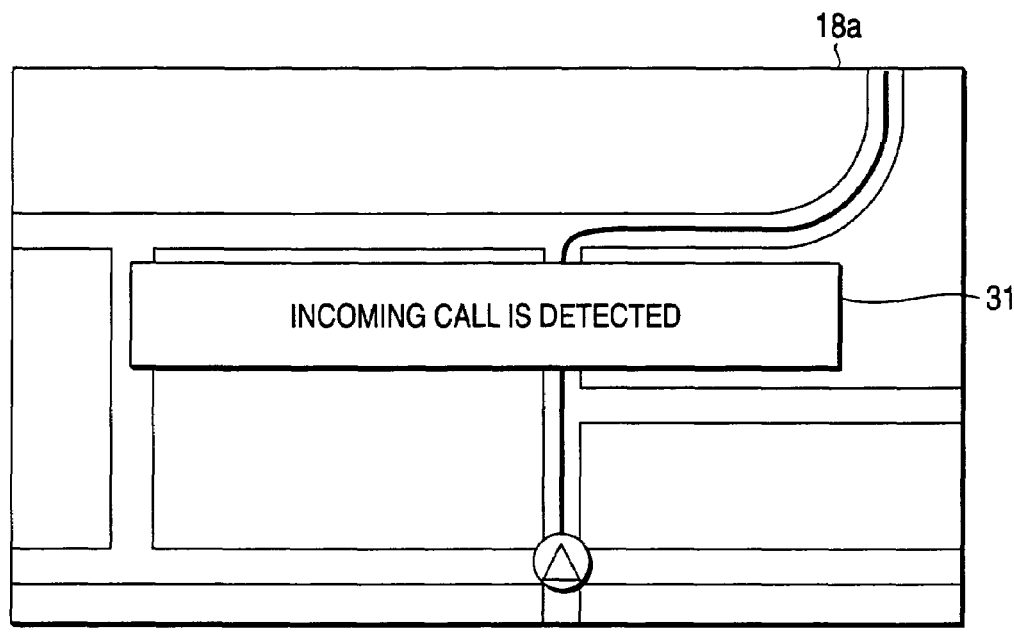
FIG. 2 is a view showing an example displayed on a display screen to explain a utilization mode of the navigation apparatus according to the embodiment (1).

FIG. 2 shows a display example that the incoming call of the communication portion 19 is detected while the navigation screen for guiding to the destination is being displayed to execute a route guidance to the destination. Call incoming information 31 indicating that the incoming call is detected is displayed on the display screen 18a. In this case, if the incoming call is issued from the person who is registered previously in the phone book database stored in the memory 23, the name, the phone number, etc. of the person who issued the incoming call can be also displayed.

Figure 3:
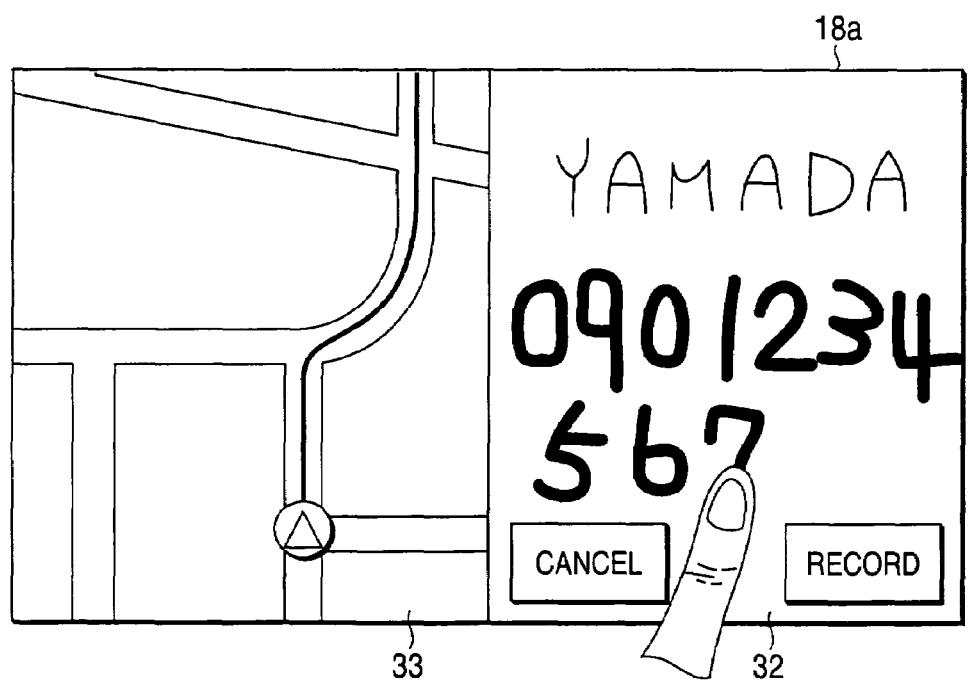
FIG. 3 is a view showing an example displayed on the display screen to explain a utilization mode of the navigation apparatus according to the embodiment (1).

Then, when the system enters into a call mode by a predetermined call-receiving operation, the display screen 18a is shifted to the split display screen shown in FIG. 3. In the split display screen shown in FIG. 3, a memo screen 32, on which the characters, etc. input by the handwriting via the touch panel 18b are drawn and displayed, and a navigation screen 33, on which the map information, etc. used to execute the route guidance are displayed continuously, are displayed in a split mode on the display screen 18a. In this display mode, the user can take notes easily by inputting contents, which are to be noted on the memo screen 32, by the handwriting.

Then, when a "record" button being displayed on the memo screen 32 is pushed (touch-input) via the touch panel 18b, a process of recognizing the drawing data such as the handwritten characters, etc. as the character data is executed. Then, the screen is shifted to a "character-recognition check" screen shown in FIG. 4.

Figure 4:
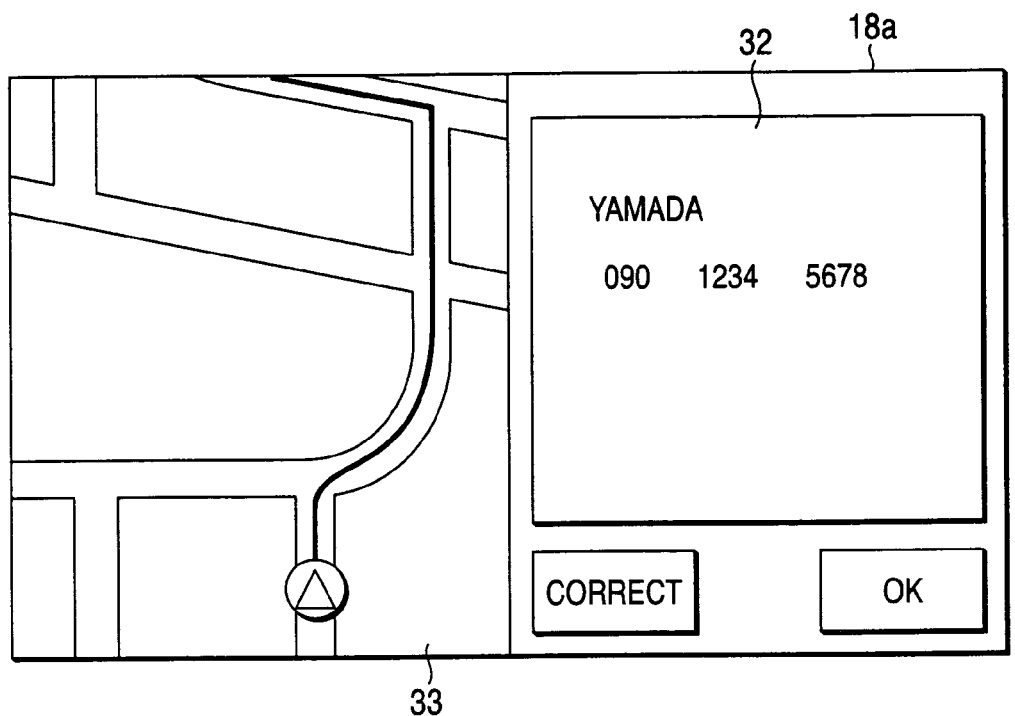
FIG. 4 is a view showing an example displayed on the display screen to explain a utilization mode of the navigation apparatus according to the embodiment (1).

In the character-recognition check screen shown in FIG. 4, the recognized characters are displayed on the memo screen 32. When results of the character recognition contain a portion to be corrected and also a "correct" button is touch-input, the screen is shifted to a correction screen (not shown). Then, the correction can be carried out by predetermined correcting procedures, for example, by the correction input of the characters that are input by the handwriting via the touch panel 18b, the correction input of the characters based on the Japanese syllabary display, the correction input of the characters based on the display in alphabetical order, etc.

Also, when results of the character recognition contain no correction and also an "OK" button is touch-input, the recognized character data are stored in the memory 23 as memo information, and also a process of searching whether or not the update information, which correspond to the set item of the database stored in the memory, are contained in the memo information is executed. After the searching process, if it is concluded that the update information is contained, the screen is shifted to a "database update indication" screen shown in FIG. 5.

Figure 5:
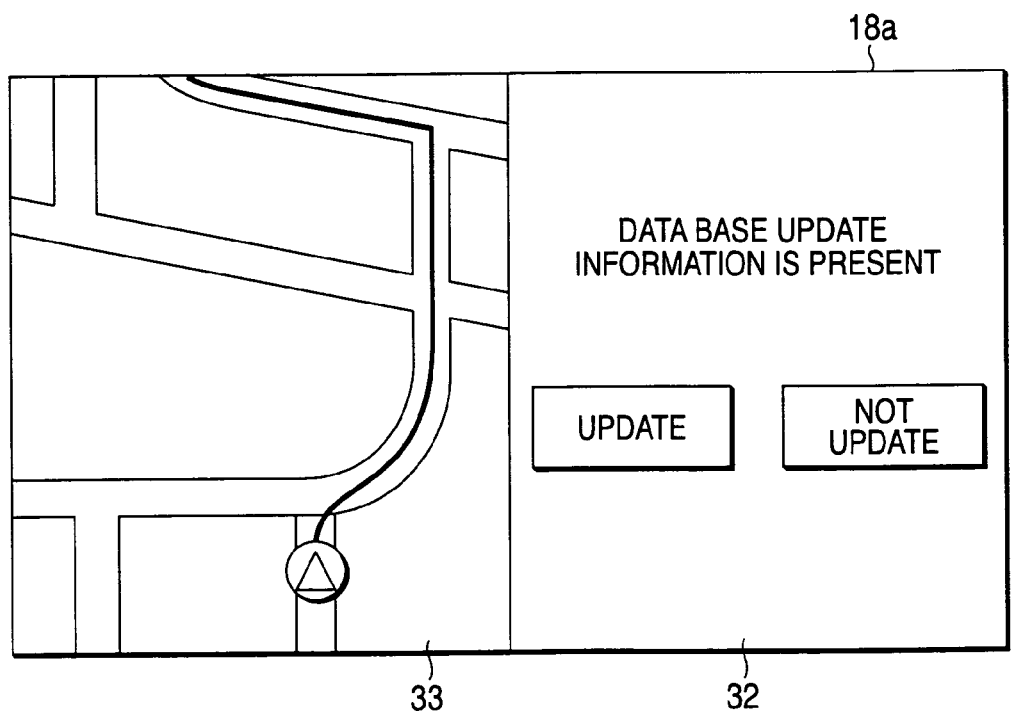
FIG. 5 is a view showing an example displayed on the display screen to explain a utilization mode of the navigation apparatus according to the embodiment (1).

In the database update indication screen shown in FIG. 5, the updating instruction of the database is displayed on the memo screen 32. When an "update" button is touch-input, the screen is shifted to an "update information check" screen shown in FIG. 6.

Figure 6:
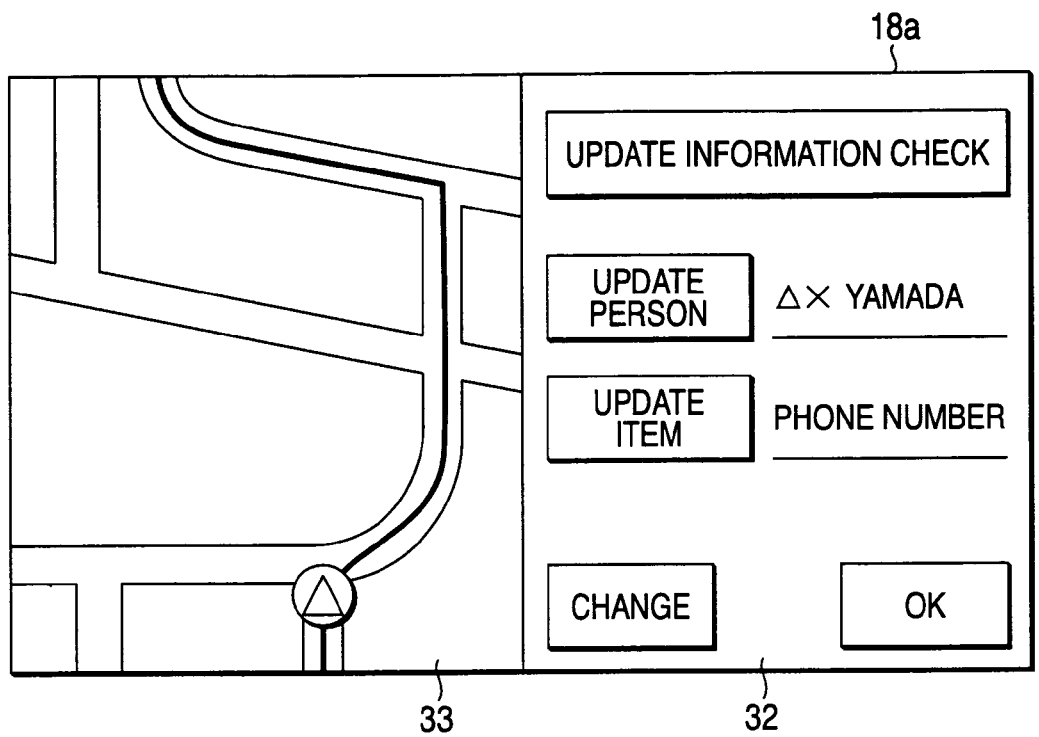
FIG. 6 is a view showing an example displayed on the display screen to explain a utilization mode of the navigation apparatus according to the embodiment (1).

In the "update information check" screen shown in FIG. 6, the update person, the update item, and the like are displayed on the memo screen 32. When an "OK" button is touch-input, the contents of the database are updated automatically. Also, when the error is found in the update person, the update item, and the like and also a "change" button is touch-input, the screen is shifted to a "change" screen (not shown) and then the update person, the update item, and the like can be changed via this change screen. After the change, the screen goes back to the update information check screen shown in FIG. 6 again. Then, when the "OK" button is touch-input, the contents of the database are updated automatically according to the setting after the change. Then, the display screen 18a is switched from the split display screen consisting of the memo screen 32 and the navigation screen 33 to one display screen consisting of the navigation screen after the updating process of the database.

Figure 7:
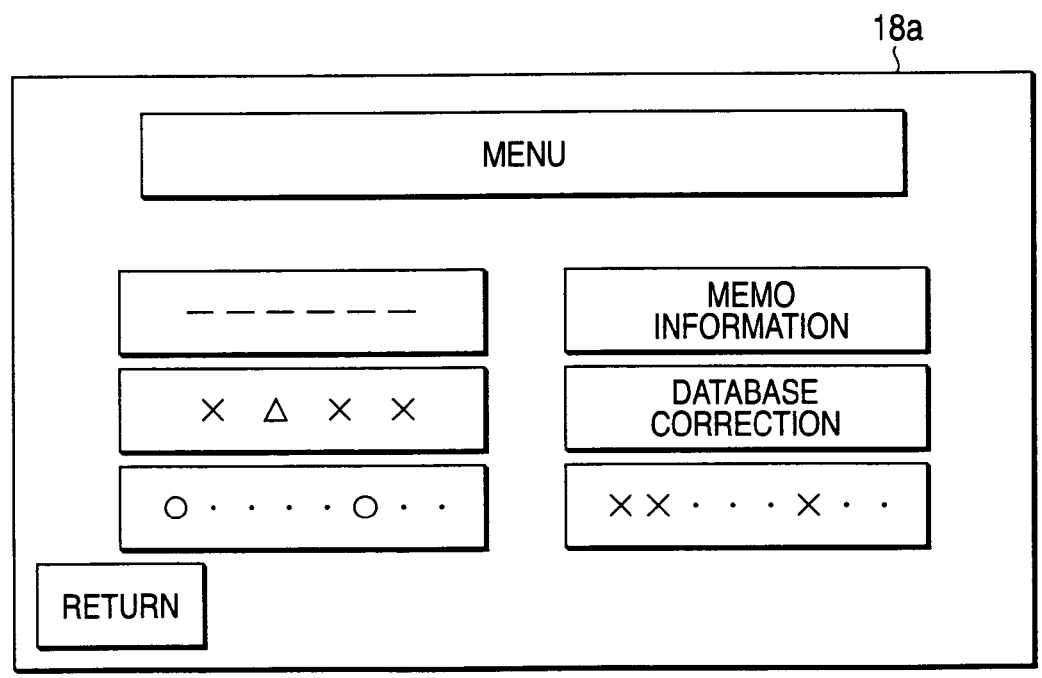
FIG. 7 is a view showing an example displayed on the display screen to explain a utilization mode of the navigation apparatus according to the embodiment (1).

Also, the memo information stored in the memory 23 can be read later. When a "memo information" button provided in the "menu" screen shown in FIG. 7 is touch-input, the screen is shifted to a "memo information list display" screen shown in FIG. 8.

In the "memo information list display" screen shown in FIG. 8, communication date, communicated person (if the other person in communication is identified), and the memo that is subjected to the character recognition are displayed. The memo information can be displayed in order of the data by operating a scroll key 34. Also, function switches such as "cancel", etc. are provided at the bottom of the screen. For example, the unnecessary memo can be erased easily by designating the memo information, which are to be cancelled, by the touch operation and then touch-inputting the "cancel" button.

Also, the information of the database stored in the memory 23 can be corrected later. If a "database correction" button provided on the "menu" screen shown in FIG. 7 is touch-input, the screen is shifted to a "correcting-database selection" screen shown in FIG. 9.

In the "correcting-database selection" screen shown in FIG. 9, a list of the databases stored in the memory 23 is displayed and the database containing information to be corrected can be selected. Then, a button of the database containing the information to be corrected (in this case, "phone book database") is touch-input, the screen is shifted to a "phone book database correction" screen shown in FIG. 10.

In the "phone book database correction" screen shown in FIG. 10, a screen on which the name of the person containing the information to be corrected is selected is displayed. When the name of the person containing the information to be corrected is displayed and then a name button that is being displayed (in this case, "Yamashita..." button) is touch-input, the screen is shifted to a "correcting item selection" screen shown in FIG. 11.

In the "correcting item selection" screen shown in FIG. 11, a list of the set items of the database is displayed, and the set item containing the information to be corrected can be selected. Then, a button of the set item containing the information to be corrected (in this case, "phone number" button) is touch-input, the screen is shifted to a "item correction" screen shown in FIG. 12.

In the "item correction" screen shown in FIG. 12, the registered information can be corrected. In this case, the phone number can be corrected into the correct phone number by touch-inputting the numeral button. If an "end" button is touch-input after the correction, the phone number is corrected to the corrected content. Then, the screen returns to the menu screen shown in FIG. 7.

Figure 13:
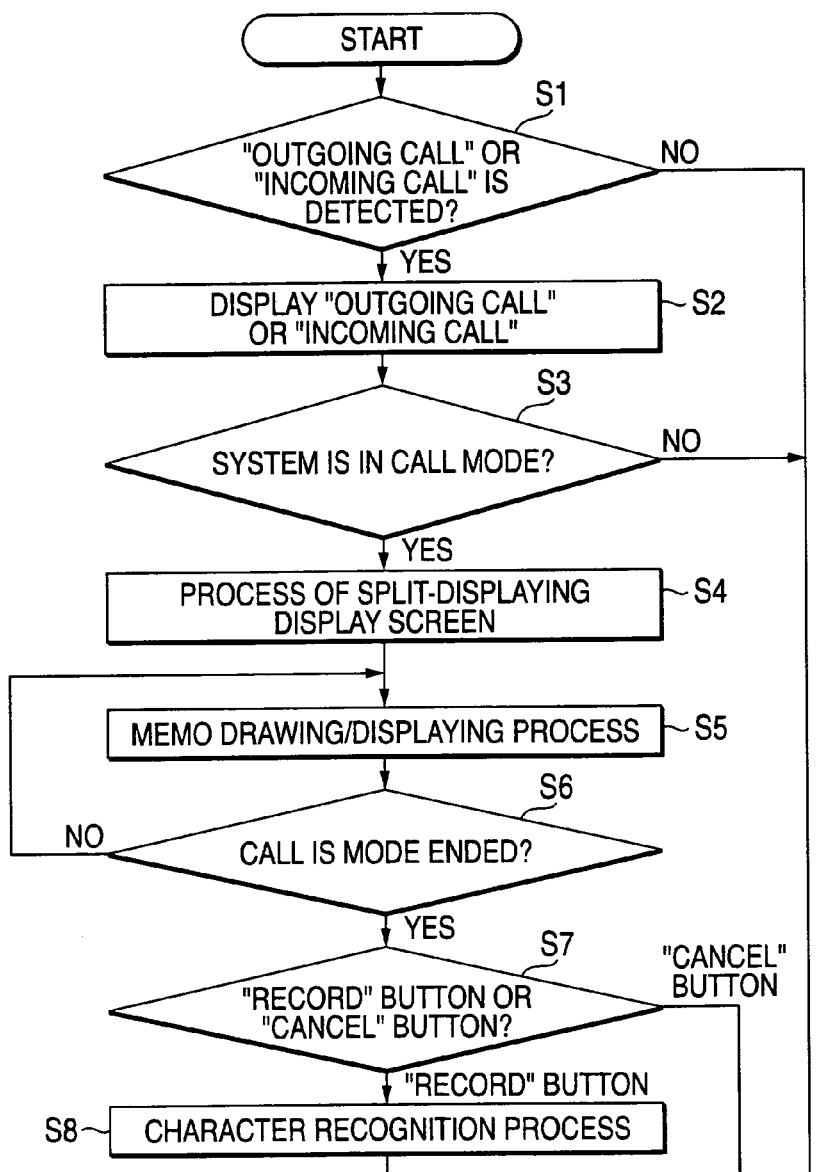
FIG. 13 is a flowchart explaining processing operations of a memo function executed by a navigation control portion in the navigation apparatus according to the embodiment (1).

Next, processing operations of the memo function executed by the navi control portion 10 in the navigation apparatus according to the embodiment (1) will be explained with reference to a flowchart shown in FIG. 13 hereunder.

First, in step S1, it is decided whether or not the "outgoing call" or the "incoming call" of the communication portion 19 is detected. If it is concluded that the "outgoing call" or the "incoming call" of the communication portion 19 is detected, the process goes to step S2. In contrast, if it is concluded that the "outgoing call" or the "incoming call" of the communication portion 19 is not detected, the process is ended.

In step S2, the display indicating that the outgoing call or incoming call is detected as shown in FIG. 2 is executed. Then, the process goes to step S3.

In step S3, it is decided whether or not the navigation apparatus has entered into the call mode, i.e., the system is in a call mode. If it is concluded that the system has entered into the call mode, the process goes to step S4. In contrast, in step S3, when it is concluded that the system has not entered into the call mode, the process is ended.

In step S4, the process of splitting the display screen 18a into the memo screen 32 and the navigation screen 33 shown in FIG. 3 to display it is executed. Then, the process goes to step S5. In step S5, the memo drawing/displaying process, i.e., the process of drawing/displaying the memo contents such as the characters, numerals, etc., which are input into the memo screen 32 by the handwriting via the touch panel 18b, on the memo screen 32 is executed. Then, the process goes to step S6.

In step S6, it is decided whether or not the call mode is ended, i.e., the talking state is disconnected. If it is concluded that the call mode is not ended, the process goes back to step S5. In contrast, if it is concluded that the call mode is ended, the process goes to step S7.

In step S7, it is decided which one of a "record" button, which is used to store the memo being drawn on the memo screen 32 into the memory 23 as the memo information, and a "cancel" button, which is used to cancel the memo being drawn on the memo screen 32, is touch-input. If it is concluded that the "record" button is input, the process goes to step S8. In contrast, if it is concluded that the "cancel" button is input, the drawing data are canceled. Then, the process goes to step S19.

In step S8, the character recognizing process, i.e., the process of causing the character recognition portion 22 to recognize the memo contents, which are drawn on the memo screen 32, as the character data is executed. Then, the process goes to step S9. In step S9, as shown in FIG. 4, the process of displaying the characters recognized by the character recognition portion 22 on the memo screen 32. Then, the process goes to step S10.

In step S10, it is decided whether or not the "OK" button displayed on the memo screen 32 is touch-input. If it is concluded that the "OK" button is touch-input, the process goes to step S11.

In contrast, in step S10, if it is concluded that the "OK" button is not touch-input, the process goes to step S20. In step S20, it is decided whether or not a "correction" button is touch-input. If it is concluded that the "correction" button is touch-input, the process goes to step S21. In step S21, the recognized character correcting process, i.e., the process of correcting the recognized characters is executed. Aster the correcting process, the process goes back to step S10. In contrast, in step S20, if it is concluded that the "correction" button is not touch-input, the process goes back to step S10.

In step S11, the process of storing the communication date, the other person in communication, and the recognized characters into the memory 23 as the memo information is executed. Then, the process goes to step S12.

In step S12, the process of searching whether or not the update information, which correspond to the set item of the database stored in the memory 23, are contained in the memo information is executed. Then, the process goes to step S13.

In step S13, it is decided whether or not the update information are contained in the memo information. If it is concluded that the update information are contained, the process goes to step S14. In contrast, in step S13, if it is concluded that the update information are not contained, the process goes to step S19.

In step S14, the process of displaying the update indication screen of the database update information shown in FIG. 5 on the memo screen 32 is executed. Then, the process goes to step S15. In step S15, it is decided which one of an "update" button, which is used to update the information to the recognized characters, and a "not update" button, which is used not to update the information, is touch-input. If it is concluded that the "update" button is touch-input, the process goes to step S16. In contrast, in step S15, it is concluded that the "not update" button is touch-input, the process goes to step S19.

In step S16, the process of displaying the "update information check" screen shown in FIG. 6 on the memo screen 32 is executed. Then, the process goes to step S17. In step S17, it is decided whether or not an "OK" button for updating the database by using the contents displayed on the memo screen 32 is touch-input. If it is concluded that the "OK" button is touch-input, the process goes to step S18.

In contrast, in step S17, if it is concluded that the "OK" button is not touch-input, the process goes to step S22. In step S22, it is decided whether or not a "change" button that is used to change the displayed contents is touch-input. If it is concluded that the "change" button is touch-input, the process goes to step S23. In step S23, the process of changing the update person, the update item, etc. in compliance with the screen display is executed. After the change is ended, the process goes back to step S17. In contrast, in step S22, it is concluded that the "change" button is not touch-input, the process goes back to step S17.

In step S18, the database updating process of updating the contents of the update items of the update person, which are displayed on the memo screen 32, into the recognized character data is executed. Then, the process goes to step S19. In step S19, the process of switching the display screen 18a, which is split/displayed into the memo screen 32 and the navigation screen 33, to one display screen of the navigation screen is executed. Then, the process is ended.

Figure 14:
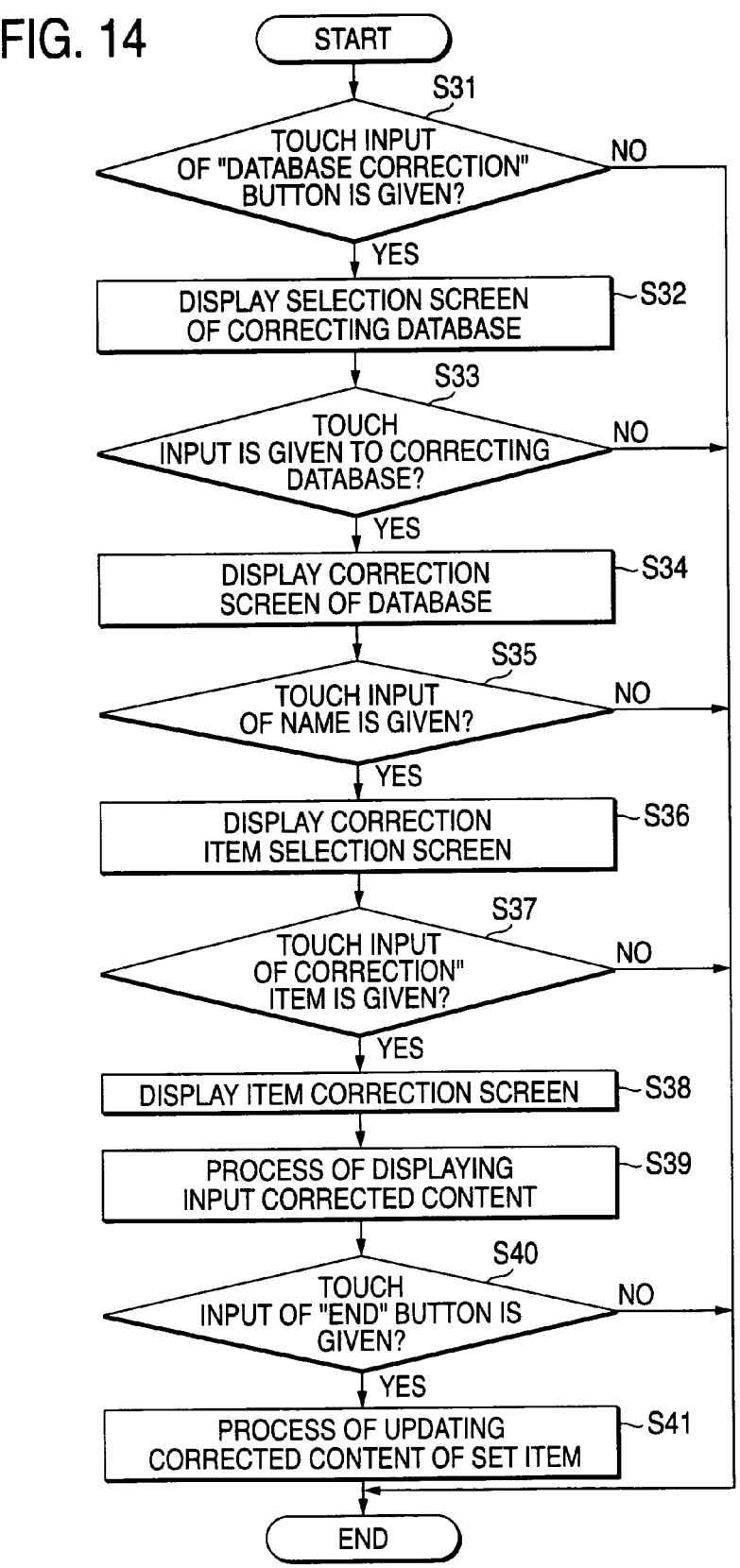
FIG. 14 is a flowchart explaining processing operations in a database correction executed by the navigation control portion in the navigation apparatus according to the embodiment (1).

Next, processing operations in the database correction executed by the navi control portion 10 in the navigation apparatus according to the embodiment (1) will be explained with reference to a flowchart shown in FIG. 14 hereunder.

First, in step S31, in the "menu" screen shown in FIG. 7, it is decided whether or not a "database correction" button is touch-input. If it is concluded that the "database correction" button is not touch-input, the process is ended. In contrast, if it is concluded that the "database correction" button is touch-input, the process goes to step S32.

In step S32, the process of displaying the correcting-database selection screen shown in FIG. 9 is executed. Then, the process goes to step S33. In step S33, it is decided whether or not the correcting database is touch-input. If it is concluded that the correcting database is not touch-input, the process is ended. In contrast, if it is concluded that the correcting database is touch-input, the process goes to step S34.

In step S34, the process of displaying the correction screen of the database shown in FIG. 10 (in this case, first a name selection screen) is executed. Then, the process goes to step S35. In step S35, it is decided whether or not the name of the person to be corrected is touch-input. If it is concluded that the name is not touch-input, the process is ended. In contrast, if it is concluded that the name is touch-input, the process goes to step S36.

In step S36, the process of displaying the correcting item selection screen shown in FIG. 11 is executed. Then, the process goes to step S37. In step S37, it is decided whether or not the item to be corrected is touch-input. If it is concluded that the item to be corrected is not touch-input, the process is ended. In contrast, if it is concluded that the item to be corrected is touch-input, the process goes to step S38.

In step S38, the process of displaying the item correction screen shown in FIG. 12 is executed. Then, the process goes to step S39. In step S39, the process of displaying the corrected content being input in the item correction screen is executed. Then, the process goes to step S40.

In step S40, it is decided whether or not an "end" button is touch-input. If it is concluded that the "end" button is not touch-input, the process is ended. In contrast, if it is concluded that the "end" button is touch-input, the process goes to step S41. In step S41, the process of updating the content of the selected set item into the corrected content is executed. Then, the process is ended.

According to the navigation apparatus according to the above embodiment (1), when the incoming call or the outgoing call of the communication portion 19 is detected, the display screen 18a is split/displayed into the memo screen 32 and the navigation screen 33 and then the memo contents can be drawn/displayed by the handwriting via the touch panel 18b on the memo screen 32. Hence, the user is not required to take out the writing paper, the writing tool, etc. every time and to prepare them previously, in order to take the notes. Therefore, the user can take notes easily and the convenience in use for the user can be improved.

Also, the drawing data are recognized as the character data by the voice recognition portion 22, and then the recognized character data are displayed on the memo screen 32. Therefore, the user can check whether or not the character recognition has been executed precisely. Also, the recognized character data are stored as the memo information in the memory 23. Therefore, a memory capacity can be reduced rather than a case where the drawing data are stored. Also, the character data that are subjected to the character recognition can be used positively in the application such as the update of the database stored in the memory 23. As a result, the availability of the drawing data can be enhanced.

Also, the searching process of extracting the character data, which correspond to the contents of the set items, from the character data, which are subjected to the character recognition, based on the character extraction keywords that are set beforehand to correspond to the set items of the database. Thus, if it is concluded that the update information are contained in the character data, such update information can be registered in the predetermined database. Therefore, a labor that is required of the user to input registered items separately and register them in the database can be omitted, and the navigation apparatus becomes serviceable and convenient of use for the user.

Also, even if the wrong data are registered in the database, such wrong data can be corrected in compliance with the database correction screen and also necessary contents can be added later. Therefore, a precision of the information that are registered in the database stored in the memory 23 can be enhanced.

Figure 15:
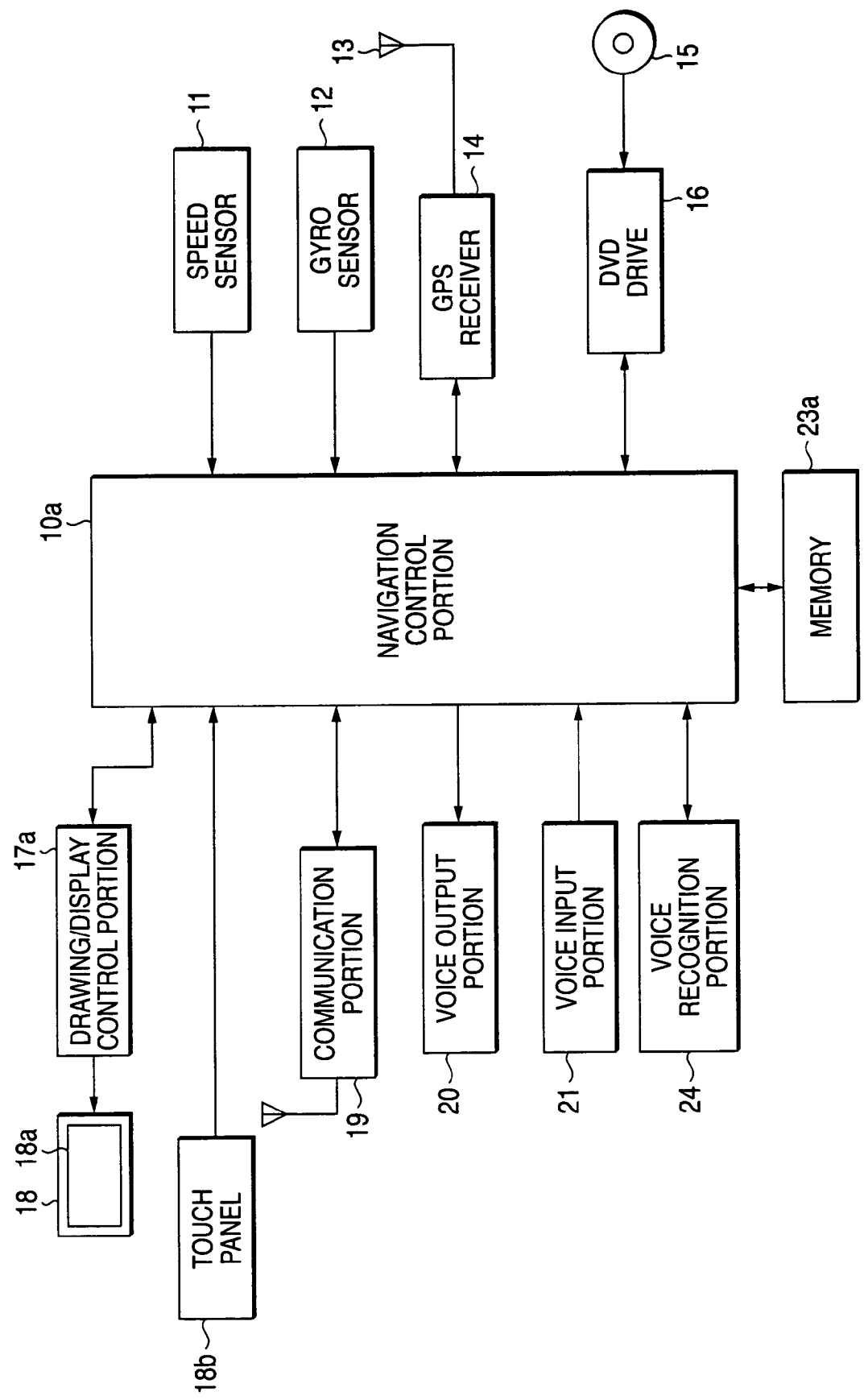
FIG. 15 is a block diagram showing schematically a pertinent portion of a navigation apparatus according to an embodiment (2) of the invention.

Next, a navigation apparatus according to an embodiment (2) of the invention will be explained hereunder. FIG. 15 is a block diagram showing schematically a pertinent portion of the navigation apparatus according to the embodiment (2). In this case, the same symbols are affixed to the similar constituent parts to those in the navigation apparatus according to the embodiment (1) shown in FIG. 1, and thus their explanation will be omitted herein.

A difference between the navigation apparatus according to the embodiment (2) and the navigation apparatus according to the embodiment (1) is that a voice recognition portion 24 is connected to a navi control portion 10a in place of the character recognition portion 22. The character data that are voice-recognized by the voice recognition portion 24 are displayed as a memo (conversation memo) on the memo screen that is displayed in the split display mode after the system entered into the call mode. Also, different symbols are affixed to the navi control portion 10a, a drawing/display control portion 17a, and a memory 23a, which have different functions from those in the embodiment (1).

The voice recognition portion 24 executes a process of recognizing the voice data, which are received by the voice input portion 21, and the voice data, which are received by the communication portion 19, as the character data based on the instruction issued from the navigation control portion 10a.

In procedures in the voice recognizing process executed by the voice recognition portion 24, first a voice interval indicating an interval in which an target voice to be recognized is present is detected. Then, the voice analysis for analyzing features of the target voice to convert the voice into feature parameters is executed. Then, the phoneme recognition for separating the target voice into the phonemes or the syllables as the recognition unit of the voice to collate them with the phoneme patterns is executed. Then, the word recognition for combining the words based on the recognized results obtained at a phoneme or syllable level to collate them with a word dictionary is executed. Then, the paragraph recognition for assembling the paragraph based on results of the word recognition with regard to the syntax rule is executed. Then, the text recognition is executed by utilizing the wide-range knowledge such as the context, the meaning, etc. According to such process procedures, the precise voice recognition can be carried out.

The memo information displayed on the memo screen based on the voice recognition, the databases (the phone book database, the destination database, etc.) constructed by the predetermined set items, the voice operation keywords used to execute processes of the predetermined operations such as the memo display start and the like by the voice recognition, and character extraction keywords used to extract the update information of the database from the character data that are subjected to the voice recognition are stored in the memory 23a.

The navi control portion 10a causes the display device 18 to split/display the display screen 18a into the memo screen and the navigation screen, and then reads the voice operation keyword stored in the memory 23a. Thus, the voice that is received by the voice input portion 21 is subjected to the voice recognition by the voice recognition portion 24. Then, if the navi control portion 10a decides the character data, which is subjected to the voice recognition by the voice recognition portion 24, coincide with the memo display starting keyword in the voice operation keywords, the navi control portion 10a issues an instruction to the drawing/display control portion 17a to display the character data, which is subjected to the voice recognition by the voice recognition portion 24, on the memo screen.

The drawing/display control portion 17a starts the process of displaying the character data on the memo screen in a conversational form, based on the instruction issued from the navi control portion 10a.

Also, the navi control portion 10a executes the process of storing the memo contents displayed on the memo screen into the memory 23 as the memo information, then reads the character extraction keyword from the memory 23 after the storing process, and then executes the process of extracting the character data, which relates to the character extraction keyword, from the memo information. Then, if the related character data are extracted, the process of updating the contents of the database, in which the set item associated with the character extraction keyword is provided, into the contents of the character data is executed.

Also, the navi control portion 10a executes the process of registering the voice operation keywords and the character extraction keywords, and can execute the display of the register screen, the setting of the register keywords, etc.

FIG. 16 to FIG. 27 are views showing examples displayed on the display screen 18a to explain utilization modes of the navigation apparatus according to the embodiment (2).

Figure 16:
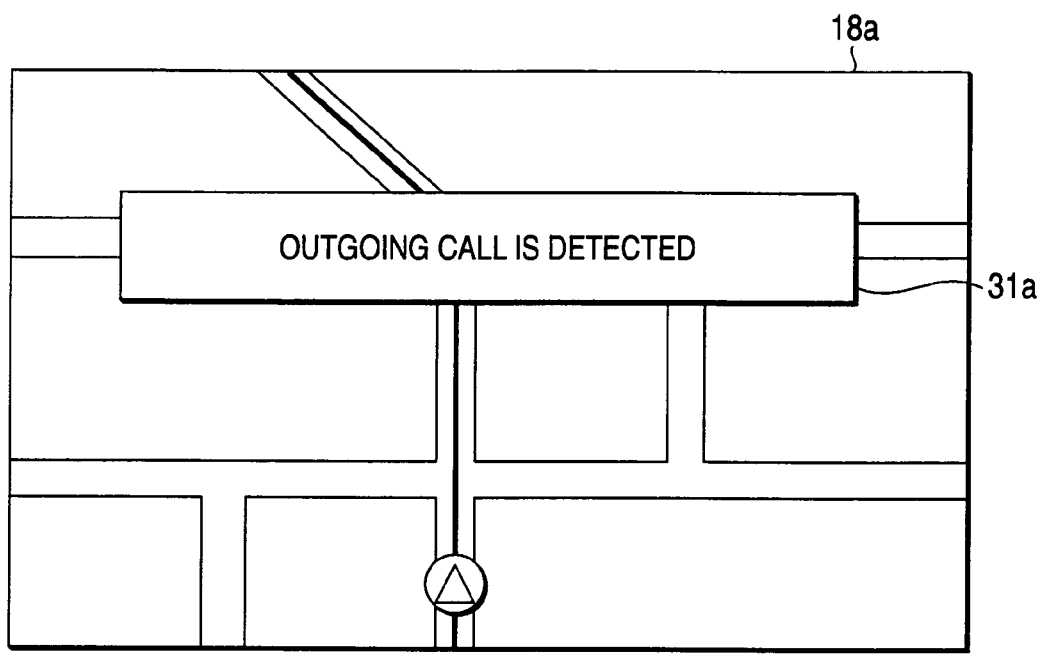
FIG. 16 is a view showing an example displayed on a display screen to explain a utilization mode of the navigation apparatus according to the embodiment (2).

FIG. 16 shows a display example in which the outgoing call of the communication portion 19 is detected while the navigation screen is being displayed to execute the route guidance to the destination. Outgoing call information 31a indicating that the outgoing call is detected is displayed on the display screen 18a.

Figure 17:
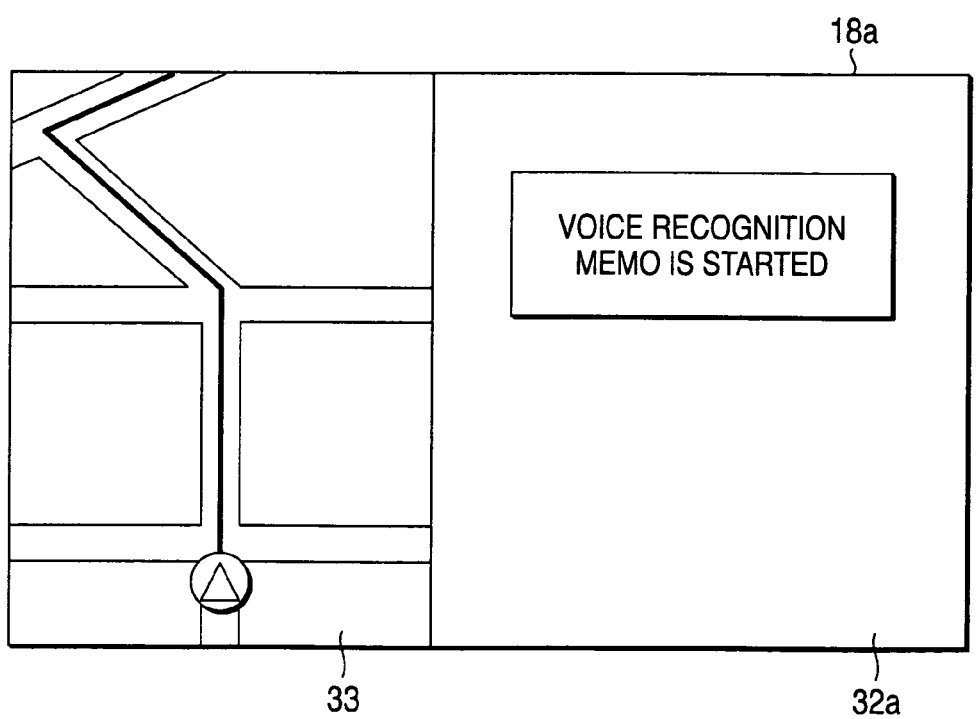
FIG. 17 is a view showing an example displayed on the display screen to explain a utilization mode of the navigation apparatus according to the embodiment (2).

Then, when the navigation apparatus entered into the call mode, the display screen 18a is shifted to the split display screen shown in FIG. 17. In the split display screen shown in FIG. 17, the display screen 18a is split/displayed into a memo screen 32a, on which the character data that are subjected to the voice recognition process can be displayed, and the navigation screen 33, and then the voice that is received by the voice input portion 21 is voice-recognized. Then, if the received voice coincides with the voice operation keyword used to start the memo display based on the voice recognition, the display informing the user of the start of the voice recognition memo, for example, "the voice recognition memo is started" is displayed on the memo screen 32a, and then the memo taken based on the voice recognition is started.

Figure 18:
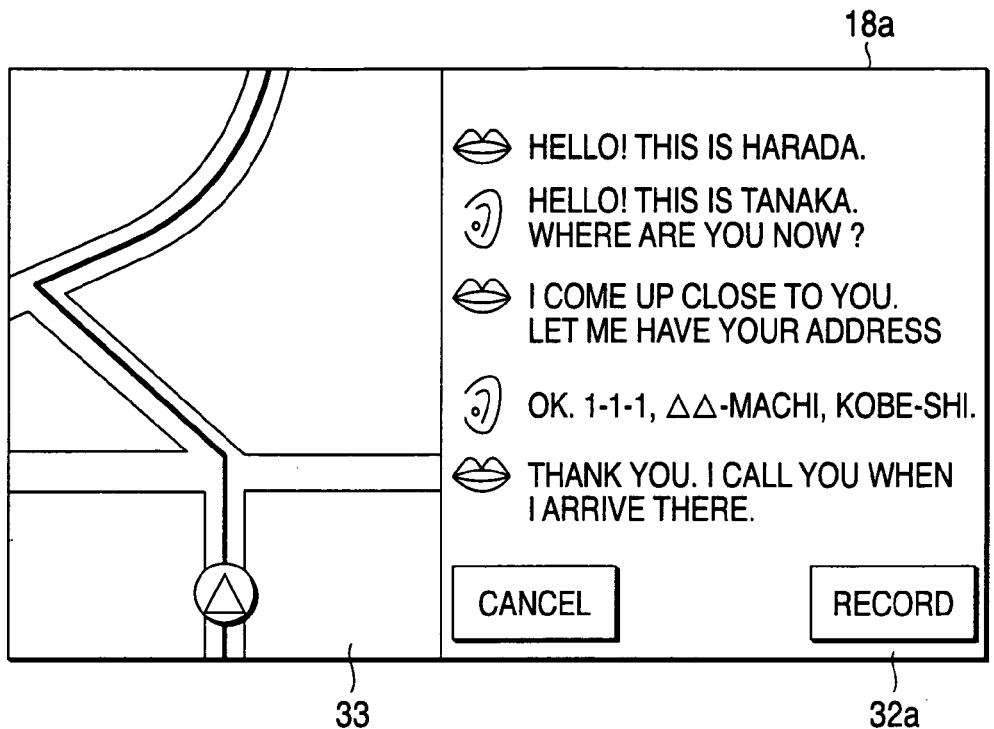
FIG. 18 is a view showing an example displayed on the display screen to explain a utilization mode of the navigation apparatus according to the embodiment (2).

FIG. 18 shows a situation where the voice recognition memo is displayed on the memo screen 32a. The guide map for the guided routes is displayed continuously on the navigation screen 33. The conversation memos that are subjected to the voice recognition are displayed on the memo screen 32a, and the character data of the other person in communication (paragraph contents indicated by the ear mark) and the character data of the user (paragraph contents indicated by the mouth mark) are displayed.

Then, when a "record" button displayed on the memo screen 32a is touch-input, the contents displayed on the memo screen 32a are stored into the memory 23a as the memo information. Also, the character extraction keyword that is set previously is read from the memory 23a, and then the process of extracting the information that are associated with the character extraction keyword from the memo information is executed. Then, if the update information of the database stored in the memory 23a are contained in the memo information, the screen is shifted to a data extraction screen shown in FIG. 19.

Figure 19:
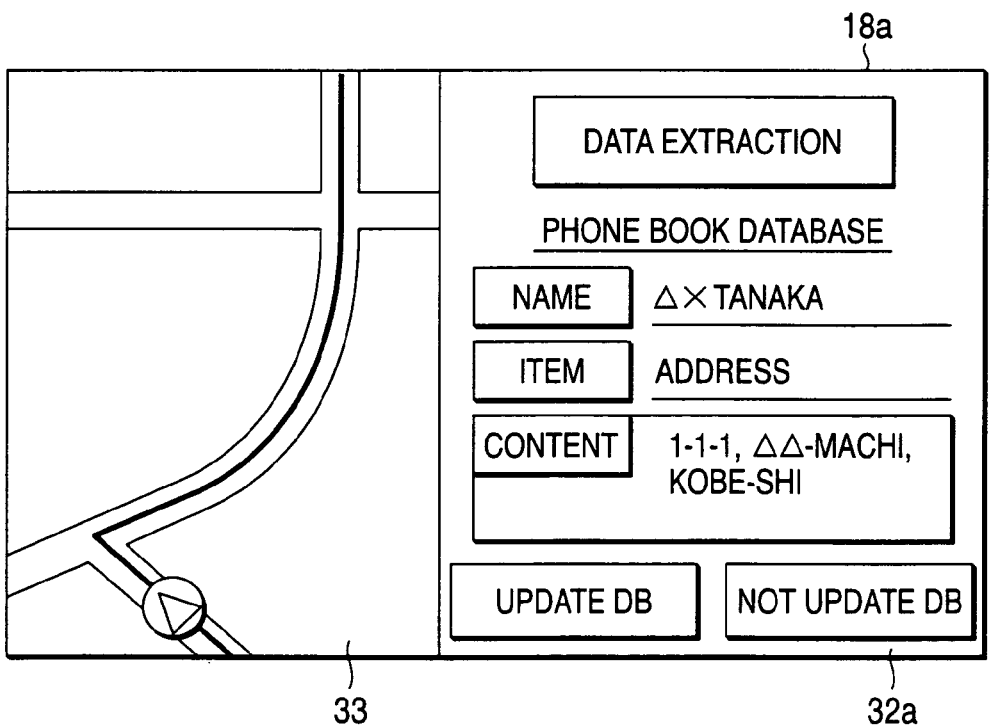
FIG. 19 is a view showing an example displayed on the display screen to explain a utilization mode of the navigation apparatus according to the embodiment (2).

In the data extraction screen shown in FIG. 19, the name of the database in which the update information are contained (in this case, the "phone book database"), the name of the person who contains the update information, the update item, the update contents, and the operation buttons are displayed.

Then, when a "DB update" button is touch-input, the database update process of rewriting the data into the displayed contents is executed. Then, after the update process of the database is executed, the display screen 18a is switched from the split display screen consisting of the memo screen 32a and the navigation screen 33 to one display screen of the navigation screen.

Figure 20:
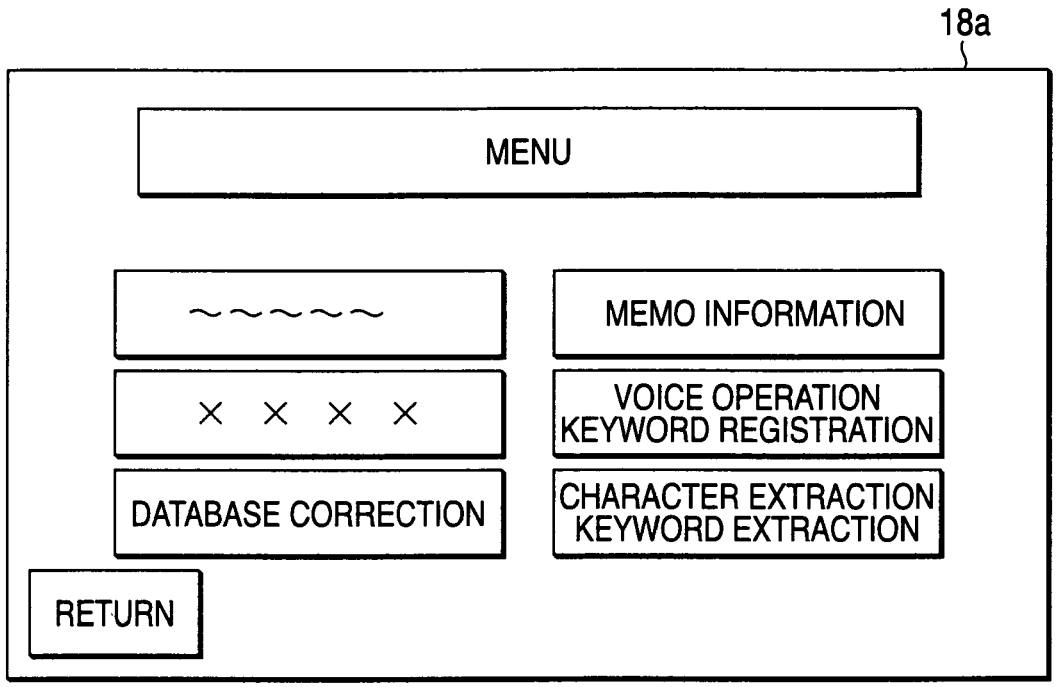
FIG. 20 is a view showing an example displayed on the display screen to explain a utilization mode of the navigation apparatus according to the embodiment (2).

Also, the user can register the voice operation keyword and the character extraction keyword stored in the memory 23a. First, when a "voice operation keyword registration" button provided on the menu screen shown in FIG. 20 is touch-input, the screen is shifted to a "voice operation keyword registration" screen shown in FIG. 21.

Figure 21:
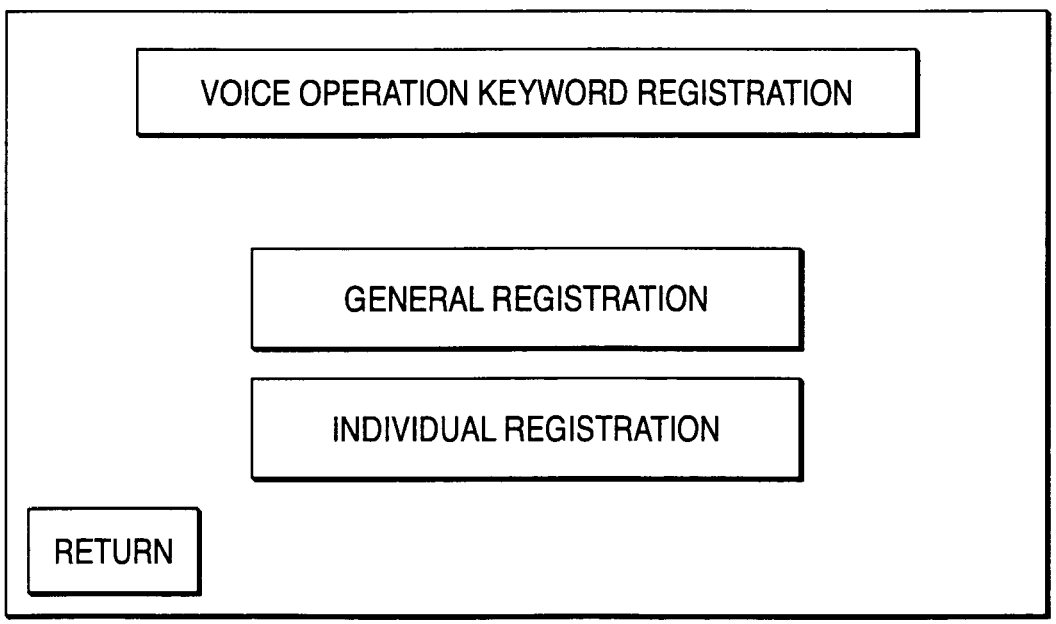
FIG. 21 is a view showing an example displayed on the display screen to explain a utilization mode of the navigation apparatus according to the embodiment (2).

In the "voice operation keyword registration" screen shown in FIG. 21, a "general registration" button and an "individual registration" button are displayed. When the "general registration" button is touch-input, the screen is shifted to a "general registration" screen shown in FIG. 22.

Figure 22:
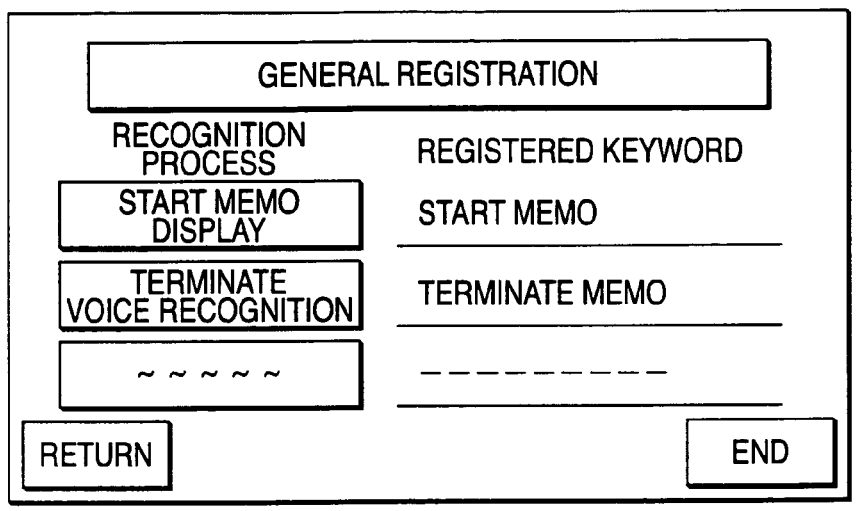
FIG. 22 is a view showing an example displayed on the display screen to explain a utilization mode of the navigation apparatus according to the embodiment (2).

In the "general registration" screen shown in FIG. 22, the voice operation keyword that is common to all other persons in communication can be registered. In this case, a "start memo display" process for starting the display of memo by the voice recognition and a "terminate voice recognition" process for terminating the display of the voice recognition and the memo are listed the recognition process. The voice operation keywords corresponding to respective processes can be registered.

Figure 23:
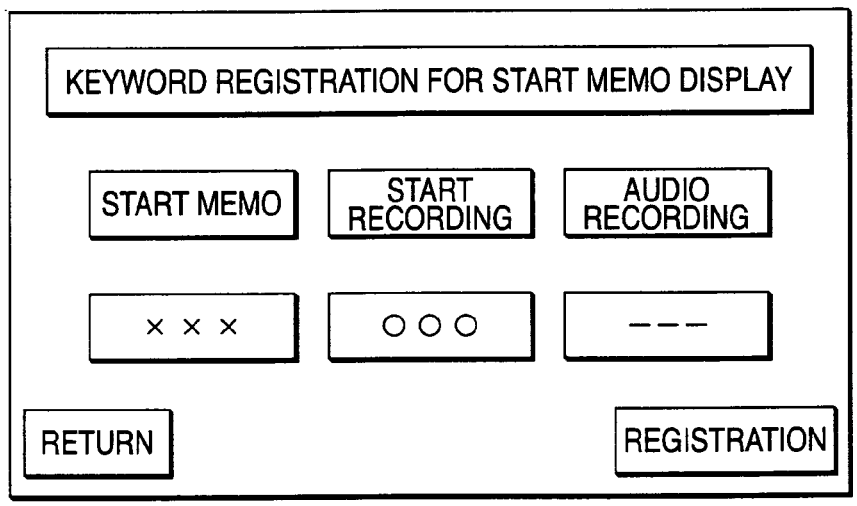
FIG. 23 is a view showing an example displayed on the display screen to explain a utilization mode of the navigation apparatus according to the embodiment (2).

For example, when a "start memo display" button shown in FIG. 22 is touch-input to register the voice operation keyword of the memo display starting process, the screen is shifted to a "keyword registration for start memo display" screen shown in FIG. 23.

In the "keyword registration for start memo display" screen shown in FIG. 23, a list of the memo-display start keywords that are set previously is displayed. Then, when a display button on which the predetermined keyword is written is touch-input and also a "registration" button is touch-input, the memo-display start keyword is registered.

Figure 24:
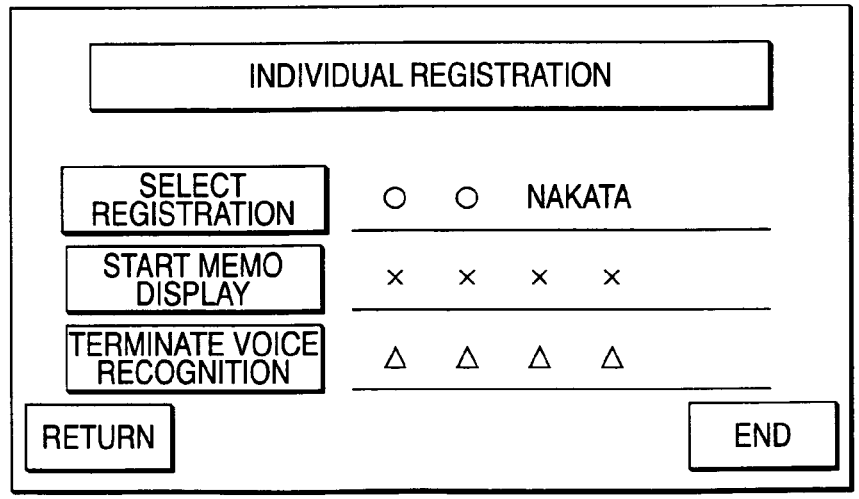
FIG. 24 is a view showing an example displayed on the display screen to explain a utilization mode of the navigation apparatus according to the embodiment (2).

Also, in the "voice operation keyword registration" screen shown in FIG. 21, when the "individual registration" button is touch-input, the screen is shifted to an "individual registration" screen shown in FIG. 24.

In the "individual registration" screen shown in FIG. 24, the voice operation keywords can be registered individually in response to the other person to/from which the call of the communication portion 19 is issued/received (the other person in communication). First, when a "select registrant" button is touch-input, the screen is shifted to a "select registrant" screen (not shown). For example, when the names of the registrants (the names of the persons registered in the phone book database) are scroll-displayed and the name of the registrant that should be individually registered is touch-input, the screen returns to FIG. 24. Thus, the selected registrant name is displayed on the right side of the "select registrant" button. Also, the setting of the recognizing process, etc. can be executed in the same way as the method explained in FIG. 22 and FIG. 23. The voice operation keywords can be registered individually every registrant via the "individual registration" screen.

Also, in the "menu" screen shown in FIG. 20, when a "character extraction keyword registration" button is touch-input, the screen is shifted to a "character extraction keyword registration" screen shown in FIG. 25.

In the "character extraction keyword registration" screen shown in FIG. 25, the "general registration" button and the "individual registration" button are displayed, like the screen shown in FIG. 21. In FIG. 25, when the "general registration" button is touch-input, the screen is shifted to a "general registration" screen shown in FIG. 26.

In the "general registration" screen shown in FIG. 26, a list of the character extraction keywords is displayed. In this case, the character extraction keywords that are listed are the keywords as the broader term, and the keywords as the narrower term are further associated with respective keywords. Accordingly, the information that relate to the set items of the database can be extracted from the memo information without omission.

Then, when the character extraction keyword to be used is touch-input (a plurality of character extraction keywords can be set) and also the "registration" button is touch-input, the selected keyword is registered as the character extraction keyword that is common to all the other persons in communication.

Also, in FIG. 25, when the "individual registration" button is touch-input, the screen is shifted to the "individual registration" screen of the character extraction keyword shown in FIG. 27. In the "individual registration" screen shown in FIG. 27, like the "individual registration" screen of the voice operation keyword shown in FIG. 24, when the "select registrant" button is touch-input to select the predetermined registrant from the "select registrant" screen (not shown), then the character extraction keyword for the individual registration that is listed in FIG. 26 is touch-input (a plurality of character extraction keywords can be set), and then when the "registration" button is touch-input, the selected keyword is registered as the character extraction keyword peculiar to the selected registrant.

Next, processing operations of a memo function executed by the navi control portion 10a in the navigation apparatus according to the embodiment (2) will be explained with reference to a flowchart shown in FIG. 28 hereunder. In this case, since processes in steps S51 to S54 are similar to the processes in steps S1 to S4 shown in FIG. 14, their explanation will be omitted herein.

In step S54, the process of splitting/displaying the display screen 18a into the memo screen 32a and the navigation screen 33 shown in FIG. 17 is executed. Then, the process goes to step S55. In step S55, the process of reading the voice operation keyword from the memory 23a is executed. Then, the process goes to step S56.

In step S56, the process of starting the voice recognizing process that recognizes the voice data, which are received by the voice input portion 21, and the voice data of the other person in communication, which are received by the communication portion 19, as the character data is executed. Then, the process goes to step S57.

In step S57, it is decided whether or not the voice, which is received by the voice input portion 21 and is subjected to the voice recognition by the voice recognition portion 24, coincided with the voice operation keyword for the memo display start. If it is concluded that the voice does not coincide with the voice operation keyword for the memo display start, the process returns to step S57. In contrast, if it is concluded that the voice coincided with the voice operation keyword for the memo display start, the process goes to step S58.

In step S58, the process of displaying the character data, which are subjected to the voice recognition, on the memo screen 32a is executed. Then, the process goes to step S59. In step S59, it is decided whether or not the voice, which is received by the voice input portion 21 and is subjected to the voice recognition by the voice recognition portion 24, coincided with the voice operation keyword used to end the voice recognition of the memo display. If it is concluded that the voice does not coincide with the voice operation keyword used to end the voice recognition, the process goes back to step S58. In contrast, in step S59, it is concluded that the voice coincided with the voice operation keyword used to end the voice recognition, the process goes back to step S60.

In step S60, it is decided which one of the "record" button, which is used to store the memo contents displayed on the memo screen 32a in the memory 23a as the memo information, and the "cancel" button, which is used to cancel the memo information displayed on the memo screen, is touch-input. If it is concluded that the "record" button is touch-input, the process goes to step S61. In contrast, in step S60, it is concluded that the "cancel" button is touch-input, the process goes to step S68.

In step S61, the process of storing the voice-recognized memo information into the memory 23a is executed. Then, the process goes to step S62. In step S62, the process of reading the character extraction keyword from the memory 23a is executed. Then, the process goes to step S63. In step S63, the process of extracting the character data, which relates to the character extraction keyword, from the character data that are subjected to the voice recognition is executed. Then, the process goes to step S64.

In step S64, it is decided whether or not the update information of the database, which are stored in the memory 23a, are contained in the extracted character data. If it is concluded that the update information of the database are contained, the process goes to step S65. In contrast, in step S64, if it is concluded that the update information of the database are not contained, the process goes to step S68.

In step S65, the process of displaying the extracted update information of the database shown in FIG. 19 is executed. Then, the process goes to step S66. In step S66, it is decided which one of a "DB update" button and a "DB not-update" button displayed on the memo screen 32a is touch-input. If it is concluded that the "DB update" button is touch-input, the process goes to step S67. In contrast, in step S66, if it is concluded that the "DB not-update" button is touch-input, the process goes to step S68.

In step S67, the database updating process, i.e., the process of updating the database the contents of the set items in the database shown in FIG. 19 into the contents of the extracted character data is executed. Then, the process goes to step S68.

In step S68, the process of switching the display screen 18a, which is split into the memo screen 32a and the navigation screen 33, into one display screen of the navigation screen is executed. Then, the process is ended.

Figure 29:
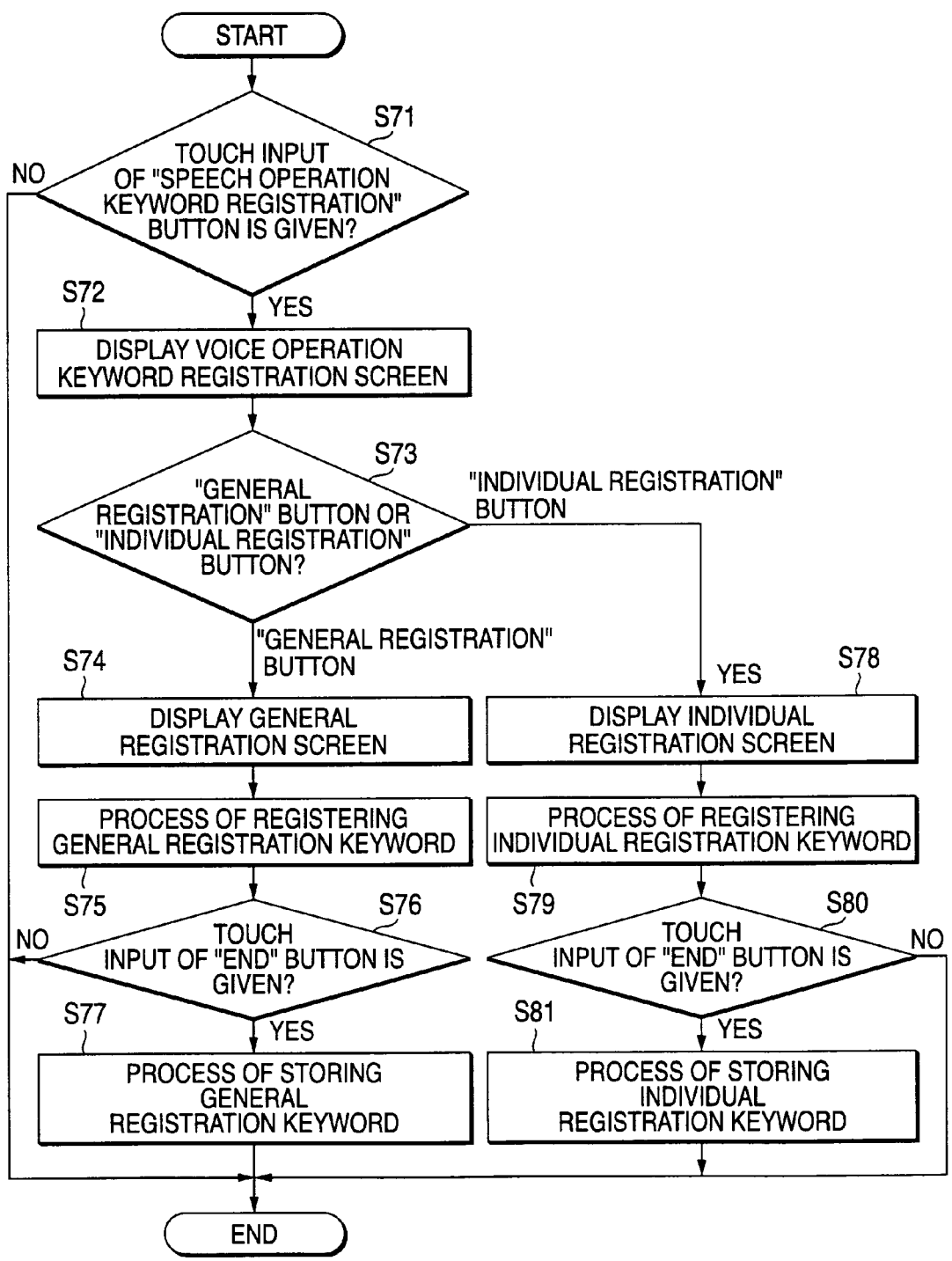
FIG. 29 is a flowchart explaining processing operations in a voice operation keyword registration executed by the navigation control portion in the navigation apparatus according to the embodiment (2).

Next, processing operations in the voice operation keyword registration executed by the navi control portion 10a in the navigation apparatus according to the embodiment (2) will be explained with reference to a flowchart shown in FIG. 29 hereunder.

First, in step S71, it is decided whether or not the "voice operation keyword registration" button is touch-input into the "menu" screen shown in FIG. 20. If it is concluded that the "voice operation keyword registration" button is not touch-input, the process is ended. In contrast, if it is concluded that the "voice operation keyword registration" button is touch-input, the process goes to step S72.

In step S72, the process of displaying the "voice operation keyword registration" screen shown in FIG. 21 is executed. Then, the process goes to step S73. In step S73, it is decided which one of the "general registration" button and the "individual registration" button displayed on the display screen 18a in FIG. 21 is touch-input. If it is concluded that the "general registration" button is touch-input, the process goes to step S74.

In step S74, the process of displaying the "general registration" screen shown in FIG. 22 is executed. Then, the process goes to step S75. In step S75, the process of registering the general registration keyword, which corresponds to each recognizing process shown in FIG. 22, is executed based on the instruction that is input by the user. Then, the process goes to step S76.

In step S76, it is decided whether or not the "end" button is touch-input. If it is concluded that the "end" button is not touch-input, the process is ended. In contrast, if it is concluded that the "end" button is touch-input, the process goes to step S77.

In step S77, the process of updating/storing the voice operation keyword, which is generally registered newly, into the memory 23a. Then, the process is ended.

In contrast, in step S73, if it is concluded that the "individual registration" button is touch-input, the process goes to step S78.

In step S78, the process of displaying the "individual registration" screen shown in FIG. 24 is executed. Then, the process goes to step S79. In step S79, the process of registering the registration keyword, which corresponds to the registrant selecting process and each recognizing process shown in FIG. 24, is executed based on the instruction that is input by the user. Then, the process goes to step S80.

In step S80, it is decided whether or not the "end" button is touch-input. If it is concluded that the "end" button is not touch-input, the process is ended. In contrast, if it is concluded that the "end" button is touch-input, the process goes to step S81.

In step S81, the process of updating/storing the voice operation keyword, which is individually registered newly, in the memory 23a is executed. Then, the process is ended.

In this case, the registration of the character extraction keyword is also carried out by the almost same processing operation as the processing operation explained as above.

According to the navigation apparatus according to the above embodiment (2), when the incoming call or the outgoing call of the communication portion 19 is detected, the display screen 18a is split/displayed into the memo screen 32a and the navigation screen 33. Then, the process of starting the memo display is executed when the voice input portion 21 receives the voice corresponding to the voice operation keyword. Then, the character data that are subjected to the voice recognition by the voice recognition portion 24 are displayed on the memo screen 32a as the memo contents. Therefore, in order to take the notes, the user is not required to take out the writing paper, the writing tool, etc. every time and to prepare them previously. Thus, the user can take notes easily by the voice. Also, since the operation to use the memo function can be executed by the voice, the operability can be improved and also the convenience in use for the user can be further improved.

Also, the voice data received via the voice input portion 21 and the voice data received via the communication portion 19 are recognized by the voice recognition portion 24, and then stored in the memory 23a as the character data. Therefore, the memory capacity can be reduced rather than the case where the voice data are stored as it is. Also, the voice-recognized character data can be practically used in the application such as the update of the database, etc. As a result, availability of the voice data can be enhanced.

Also, since the user can register the voice operation keyword and the character extraction keyword that are common to the other person in communication, the generalization of the voice operation can be achieved. Also, since the common character data that are associated with the character extraction keyword are extracted from the memo information, the update of the database can be executed appropriately. Therefore, the labor required of the user to register registration items in the database by the separate inputting can be omitted, and the navigation apparatus becomes serviceable and convenient of use for the user.

Also, the voice operation keyword and the character extraction keyword may be registered individually by the user according to the other person in communication. Also, this navigation apparatus may deal with various applications of the user by changing the voice operation keyword and the character extraction keyword according to the other person in communication.

In this case, in the above embodiment (2), the case where the character data that are subjected to the voice recognition by the voice recognition portion 24 are displayed on the memo screen 32a as the memo contents is explained. However, in another embodiment, the character recognition portion 22 explained in FIG. 1, the voice recognition portion 24, an inputting portion that can select one of these recognizing portions may be provided. The screen may be switched into the memo screen on which memo contents can be input by the handwriting or the memo screen on which memo contents can be input by the voice, in response to the selection input of the user.

In still another embodiment, the character recognition portion 22, the voice recognition portion 24, and a switching portion, which can switch automatically settings in these recognizing portions in response to the running situation, may be provided. The memo screen on which memo contents can be input by the voice may be set while the vehicle into which the navigation apparatus is installed is running. On the other hand, the memo screen on which memo contents can be input by the handwriting may be set during when the vehicle is stopped.

What is claimed is:

1. A navigation apparatus adapted to be mounted on a vehicle, to which a communication device for communicating with an external is connectable, the navigation apparatus comprising:
    a display portion operable to display information;
    an input portion for inputting memo information;
    an outgoing/incoming call determination portion operable to determine whether the communication device conducts an outgoing call and determining whether the communication device receives an incomming call;
    a display control portion operable to control the display portion,
    wherein when the outgoing/incoming call determination portion determines that the communication device conducts the outgoing call or that the communication device receives the incoming call, the display control portion divides the display portion into a memo screen on which content of the memo information is displayed and a navigation screen on which navigation information is displayed;
    a character recognition portion operable to recognize the memo information drawn on the memo screen as character data;
    a character-extraction keyword registration portion for registering a plurality of character extraction keywords utilized for extracting a predetermined character data from the character data recognized by the character recognition portion;
    a character data extraction portion operable to extract a predetermined character data from the character data based on at least one of the plurality of character extraction keywords; and
    a character data registration portion operable to register the extracted character data by the character data extraction portion in a predetermined data base, wherein the character data extraction portion comprises:
        an update information determination portion operable to determine whether update information relating to the predetermined data base is contained in the predetermined character data extracted by the character data extraction portion; and
        an update information registration portion operable to register the update information in the predetermined data base when the update information determination portion determines that the update information is contained,
    wherein the input portion includes a touch panel for drawing the memo information on the memo screen in accordance with a touch operation.

2. The navigation apparatus according to claim 1, further comprising:
    a memo input processing portion for conducting a predetermined process based on a predetermined input signal from the input portion.

3. The navigation apparatus according to claim 2, wherein the predetermined process includes a process for starting to take notes on the memo screen and a process for terminating to take notes on the memo screen.

4. The navigation apparatus according to claim 1, the navigation apparatus further comprising:
    a memo information storage portion; and
    a first storage control portion for storing the character data recognized by the character recognition portion into the memo information storage portion.

5. The navigation apparatus according to claim 4, wherein the display control portion displays the character data recognized by the character recognition portion on the memo screen.

6. The navigation apparatus according to claim 1, wherein the input portion includes a voice acquiring portion for acquiring voice as voice data,
    the navigation apparatus further comprising:
    a voice recognition portion to recogniz as character data the voice data acquired by the voice acquiring portion and voice data received by the communication device;
    a memo information storage portion; and
    a second storage control portion operable to store the character data recognized by the voice recognition portion into the memo information storage section.

7. The navigation apparatus according to claim 6, wherein the display control portion display the character data recognized by the voice recognition portion on the memo screen.

8. The navigation apparatus according to claim 1, wherein the character-extraction keyword registration portion registers the character extraction keyword for each other person in communication individually.

9. The navigation apparatus according to claim 1, further comprising:
    a character data correction portion operable to correct the character data registered in the predetermined data base by the character data registration portion, desirably.

10. A navigation apparatus adapted to be mounted on a vehicle, to which a communication device for communicating with an external is connectable, the navigation apparatus comprising:
    a display portion operable to display information;
    an input portion operable to input memo information;
    an outgoing/incoming call determination portion operable to determine whether the communication device conducts an outgoing call and determining whether the communication device receives an incoming call;
    a display control portion operable to control the display portion,
    wherein when the outgoing/incoming call determination portion determines that the communication device conducts the outgoing call or that the communication device receives the incoming call, the display control portion divides the display portion into a memo screen on which content of the memo information is displayed and a navigation screen on which navigation information is displayed;
    a voice recognition portion operable to recognize as character data the voice data acquired by the voice acquiring portion and voice data received by the communication device;
    a memo information storage portion;

a second storage control portion operable to store the character data recognized by the voice recognition portion into the memo information storage section;

a memo input processing portion operable to conduct one of a plurality of predetermined processes based on a predetermined input signal from the input portion; and an operation keyword registration portion operable to register a plurality of operation keywords, wherein when the voice data acquired by the voice acquiring portion coincides with at least one of the plurality of operation keywords, the memo input processing portion conducts the corresponding predetermined process, wherein the predetermined process comprises initiating display of the memo information on the display portion or terminating display of the memo information on the display portion.

11. The navigation apparatus according to claim 10, wherein the operation keyword registration portion registers the operation keyword for each other person in communication individually.

12. A navigation apparatus adapted to be mounted on a vehicle, to which a communication device for communicating with an external is connectable, the navigation apparatus comprising:

a display portion operable to display information;

an input portion operable to input memo information, wherein the input portion includes a voice acquiring portion operable to acquire voice as voice data;

an outgoing/incoming call determination portion operable to determine whether the communication device conducts an outgoing call and determining whether the communication device receives an incoming call;

a voice recognition portion operable to recognize as character data the voice data acquired by the voice acquiring portion and voice data received by the communication device;

a memo information storage portion;

a second storage control portion operable to store the character data recognized by the voice recognition portion into the memo information storage section;

a display control portion operable to control the display portion, wherein when the outgoing/incoming call determination portion determines that the communication device conducts the outgoing call or that the communication device receives the incoming call, the display control portion divides the display portion into a memo screen on which content of the memo information is displayed and a navigation screen on which navigation information is displayed;

a character-extraction keyword registration portion operable to register a character extraction keyword utilized for extracting a predetermined character data from the character data recognized by the voice recognition portion;

a character data extraction portion operable to extract a predetermined character data from the character data based on the character extraction keyword; and a character data registration portion operable to register the extracted character data by the character data extraction portion in a predetermined data base, wherein the character data registration portion comprises:

an update information determination portion operable to determine whether update information relating to the predetermined data base is contained in the predetermined character data extracted by the character data extraction portion; and an update information registration portion operable to register the update information in the predetermined data base when the update information determination portion determines that the update information is contained.

13. The navigation apparatus according to claim 12, wherein the character-extraction keyword registration portion registers the character extraction keyword for each other person in communication individually.

14. The navigation apparatus according to claim 12, further comprising:

a character data correction portion operable to correct the character data registered in the predetermined data base by the character data registration portion, desirably.

15. The navigation apparatus according to claim 11, wherein the display control portion displays the character data recognized by the voice recognition portion on the memo screen.

* * * * *